(12) United States Patent
Fukuda

(10) Patent No.: US 12,437,931 B2
(45) Date of Patent: Oct. 7, 2025

(54) MULTILAYER CERAMIC ELECTRONIC COMPONENT

(71) Applicant: Murata Manufacturing Co., Ltd., Nagaokakyo (JP)

(72) Inventor: Masaki Fukuda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 124 days.

(21) Appl. No.: 18/544,505

(22) Filed: Dec. 19, 2023

(65) Prior Publication Data

US 2024/0212943 A1   Jun. 27, 2024

(30) Foreign Application Priority Data

Dec. 22, 2022   (JP) .................................. 2022-205820

(51) Int. Cl.
| | | |
|---|---|---|
| H01G 4/30 | (2006.01) | |
| H01G 2/06 | (2006.01) | |
| H01G 4/008 | (2006.01) | |
| H01G 4/012 | (2006.01) | |
| H01G 4/12 | (2006.01) | |
| H01G 4/232 | (2006.01) | |

(52) U.S. Cl.
CPC .............. *H01G 4/30* (2013.01); *H01G 2/065* (2013.01); *H01G 4/008* (2013.01); *H01G 4/012* (2013.01); *H01G 4/1227* (2013.01); *H01G 4/2325* (2013.01)

(58) Field of Classification Search
CPC .......... H01G 4/30; H01G 4/2325; H01G 2/06; H01G 4/228; H01G 4/012; H01G 4/008; H01G 4/1227

USPC ..................... 361/301.4, 306.3, 321.1, 321.3
See application file for complete search history.

(56) References Cited

U.S. PATENT DOCUMENTS

| | | | | |
|---|---|---|---|---|
| 6,191,933 | B1 * | 2/2001 | Ishigaki ............... | H05K 3/3426 |
| | | | | 361/309 |
| 6,515,844 | B1 * | 2/2003 | Moriwaki .............. | H01G 2/065 |
| | | | | 361/306.3 |
| 7,436,649 | B2 * | 10/2008 | Omura ................. | H01G 4/2325 |
| | | | | 29/25.42 |
| 2019/0124771 | A1 * | 4/2019 | Park ..................... | H01G 4/2325 |
| 2019/0180943 | A1 * | 6/2019 | Togawa ............... | H10N 30/871 |
| 2019/0259533 | A1 | 8/2019 | Na | |
| 2022/0384100 | A1 * | 12/2022 | Yokomizo ................ | H01G 4/30 |

FOREIGN PATENT DOCUMENTS

| | | | |
|---|---|---|---|
| JP | 2019-145767 A | 8/2019 | |
| WO | WO-0013190 A1 * | 3/2000 | ............... H01G 9/06 |

\* cited by examiner

*Primary Examiner* — Arun Ramaswamy
(74) *Attorney, Agent, or Firm* — Keating & Bennett, LLP

(57) ABSTRACT

A multilayer ceramic capacitor includes a first multilayer ceramic capacitor main body including a first external electrode, a second multilayer ceramic capacitor main body including second external electrodes, a first bonding material bonding the first and second external electrodes, a first metal terminal and a second metal terminal respectively connectable to the first external electrode, and an exterior material covering the respective first and second multilayer ceramic capacitor main bodies and a portion of each of the first and second metal terminals. The first bonding material is bonded to the exterior material. A porosity of the first bonding material is higher than a porosity of the exterior material.

16 Claims, 31 Drawing Sheets

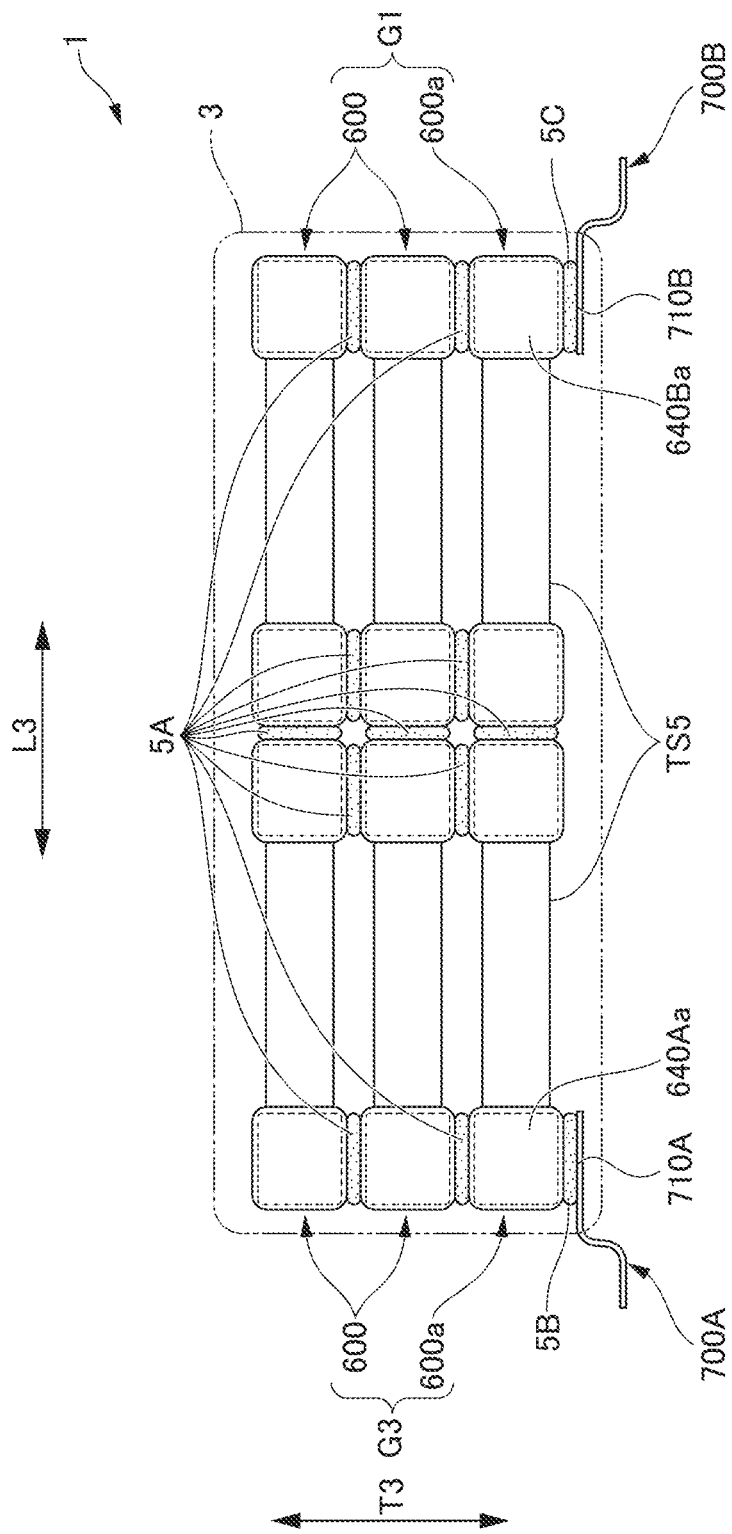

MULTILAYER CERAMIC ELECTRONIC COMPONENT

CROSS REFERENCE TO RELATED APPLICATIONS

This application claims the benefit of priority to Japanese Patent Application No. 2022-205820 filed on Dec. 22, 2022. The entire contents of this application are hereby incorporated herein by reference.

BACKGROUND OF THE INVENTION

1. Field of the Invention

The present invention relates to multilayer ceramic electronic components.

2. Description of the Related Art

Conventionally, multilayer ceramic electronic components each covered with a resin functioning as an exterior material have been known. In such multilayer ceramic electronic components, metal terminals each extending to the outside of the exterior material, and external electrodes each provided on the surface of a main body of each of the multilayer ceramic electronic components are bonded in the interior of the exterior material by a bonding material.

The multilayer ceramic electronic component described in Japanese Unexamined Patent Application Publication No. 2019-145767 is connected to a plurality of multilayer ceramic electronic component main bodies via metal terminals. Therefore, no consideration is given to a problem that occurs when the external electrodes of a plurality of multilayer ceramic electronic component main bodies are bonded to each other by a bonding material and the external electrodes overall are covered with an exterior material.

SUMMARY OF THE INVENTION

Example embodiments of the present invention provide multilayer ceramic electronic components that are each able to reduce or prevent an occurrence of peeling between a bonding material and an exterior material while reducing permeation of steam from outside when external electrodes of a plurality of multilayer ceramic electronic component main bodies are bonded to each other by a bonding material and an entirety of the external electrodes are covered with an exterior material.

An example embodiment of the present invention provides a multilayer ceramic electronic component including a first multilayer ceramic electronic component main body including a first multilayer body and a plurality of first external electrodes, the first multilayer body including a plurality of first ceramic layers laminated therein, a plurality of first internal conductor layers laminated respectively on the plurality of first ceramic layers therein, a first main surface and a second main surface opposed to each other in a first lamination direction in which the plurality of first ceramic layers and the plurality of first internal conductor layers are laminated, a first lateral surface and a second lateral surface opposed to each other in a first width direction orthogonal or substantially orthogonal to the first lamination direction, and a first end surface and a second end surface opposed to each other in a first length direction orthogonal or substantially orthogonal to the first lamination direction and the first width direction; a second multilayer ceramic electronic component main body including a second multilayer body and a plurality of second external electrodes, the second multilayer body including a plurality of second ceramic layers laminated therein, a plurality of second internal conductor layers laminated respectively on the plurality of second ceramic layers therein, a third main surface and a fourth main surface opposed to each other in a second lamination direction in which the plurality of second ceramic layers and the plurality of second internal conductor layers are laminated, a third lateral surface and a fourth lateral surface opposed to each other in a second width direction orthogonal or substantially orthogonal to the second lamination direction, and a third end surface and a fourth end surface opposed to each other in a second length direction orthogonal or substantially orthogonal to the second lamination direction and the second width direction; a first bonding material bonding any one of the plurality of first external electrodes and any one of the plurality of second external electrodes; a first metal terminal connectable to at least one external electrode selected from the plurality of first external electrodes and the plurality of second external electrodes; a second metal terminal connectable to at least one external electrode which is different from the external electrode to which the first metal terminal is connected and selected from the plurality of first external electrodes and the plurality of second external electrodes; and an exterior material covering the first multilayer ceramic electronic component main body, the second multilayer ceramic electronic component main body, a portion of the first metal terminal, and a portion of the second metal terminal, wherein the first bonding material is bonded to the exterior material, and a porosity of the first bonding material is higher than a porosity of the exterior material.

According to example embodiments of the present invention, it is possible to provide multilayer ceramic electronic components that are each able to reduce or prevent peeling between a bonding material and an exterior material, while reducing permeation of steam from outside when external electrodes of a plurality of multilayer ceramic electronic component main bodies are bonded to each other by a bonding material and the entirety of the external electrodes are covered with an exterior material.

The above and other elements, features, steps, characteristics and advantages of the present invention will become more apparent from the following detailed description of the example embodiments with reference to the attached drawings.

BRIEF DESCRIPTION OF THE DRAWINGS

FIG. 31 is a virtual arrow view when the multilayer ceramic capacitor of FIG. 28 is viewed in the direction of the arrow XXV.

DETAILED DESCRIPTION OF THE EXAMPLE EMBODIMENTS

Example embodiments of the present invention will be described below with reference to the drawings.

Figure 1:
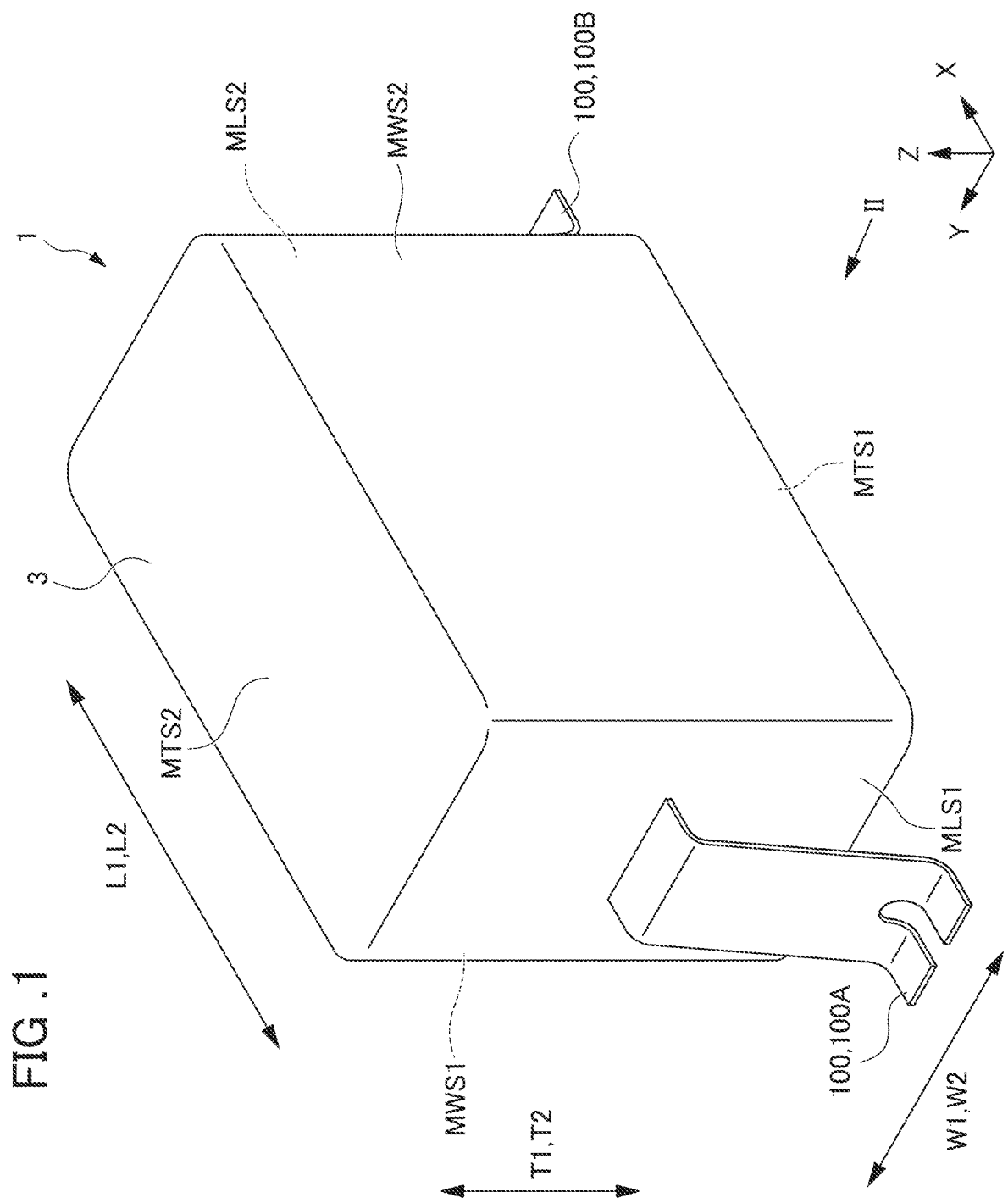
FIG. 1 is an external perspective view of a multilayer ceramic capacitor of an example embodiment of the present invention.
Figure 2:
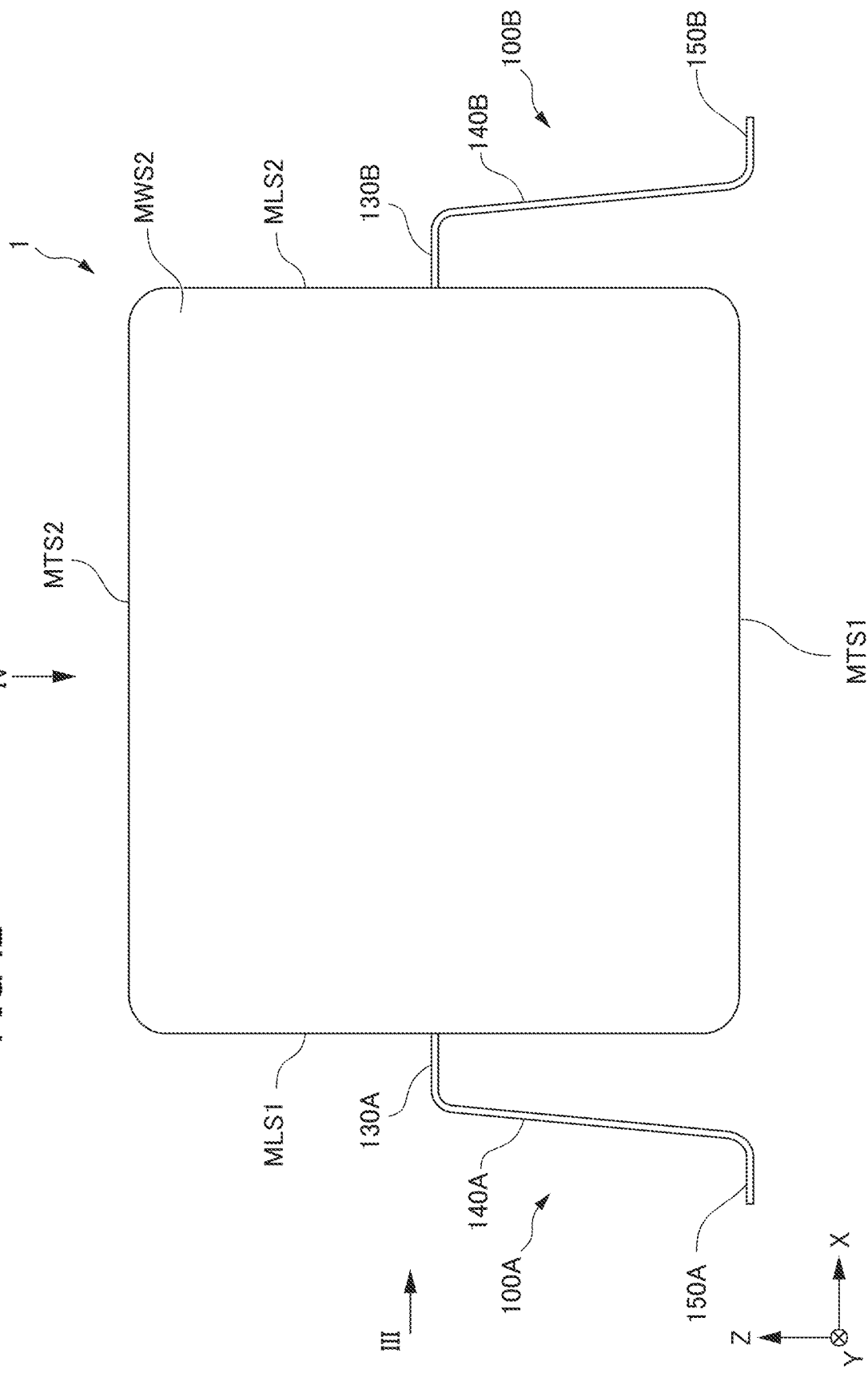
FIG. 2 is an arrow view when the multilayer ceramic capacitor of FIG. 1 is viewed in the direction of the arrow II.
Figure 3:
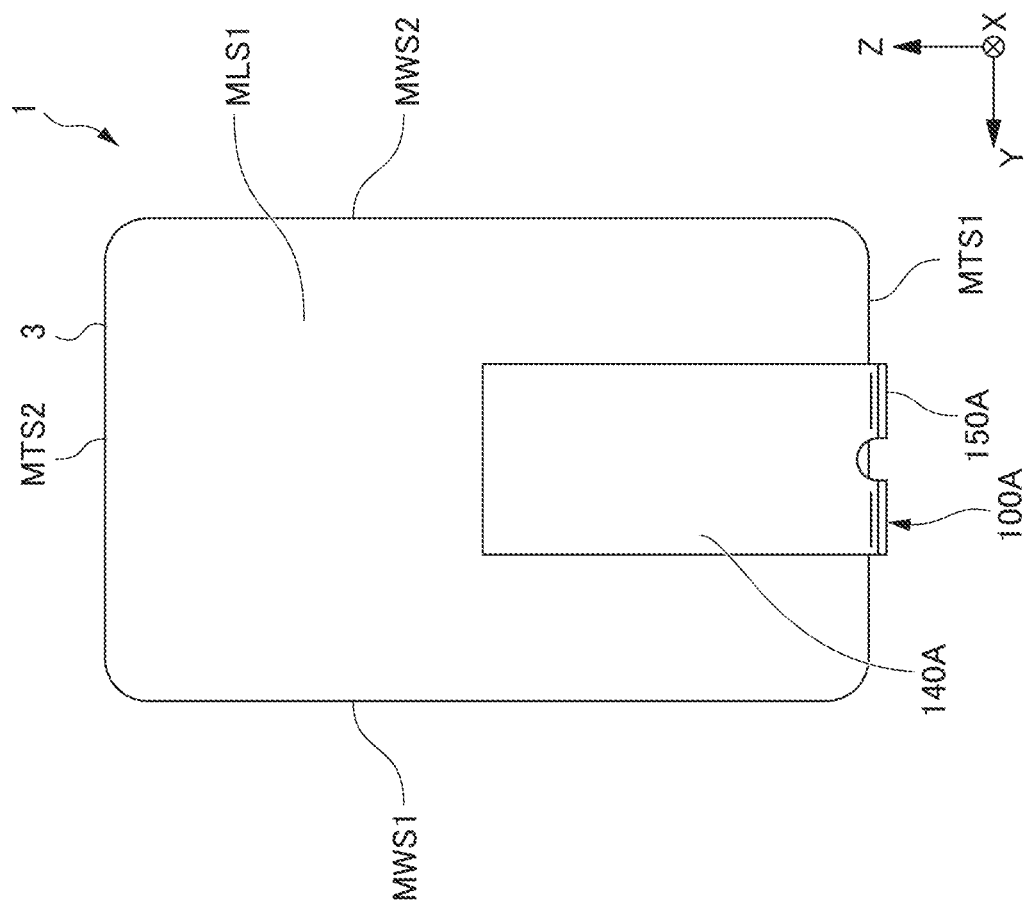
FIG. 3 is an arrow view when the multilayer ceramic capacitor of FIG. 2 is viewed in the direction of the arrow III.
Figure 4:
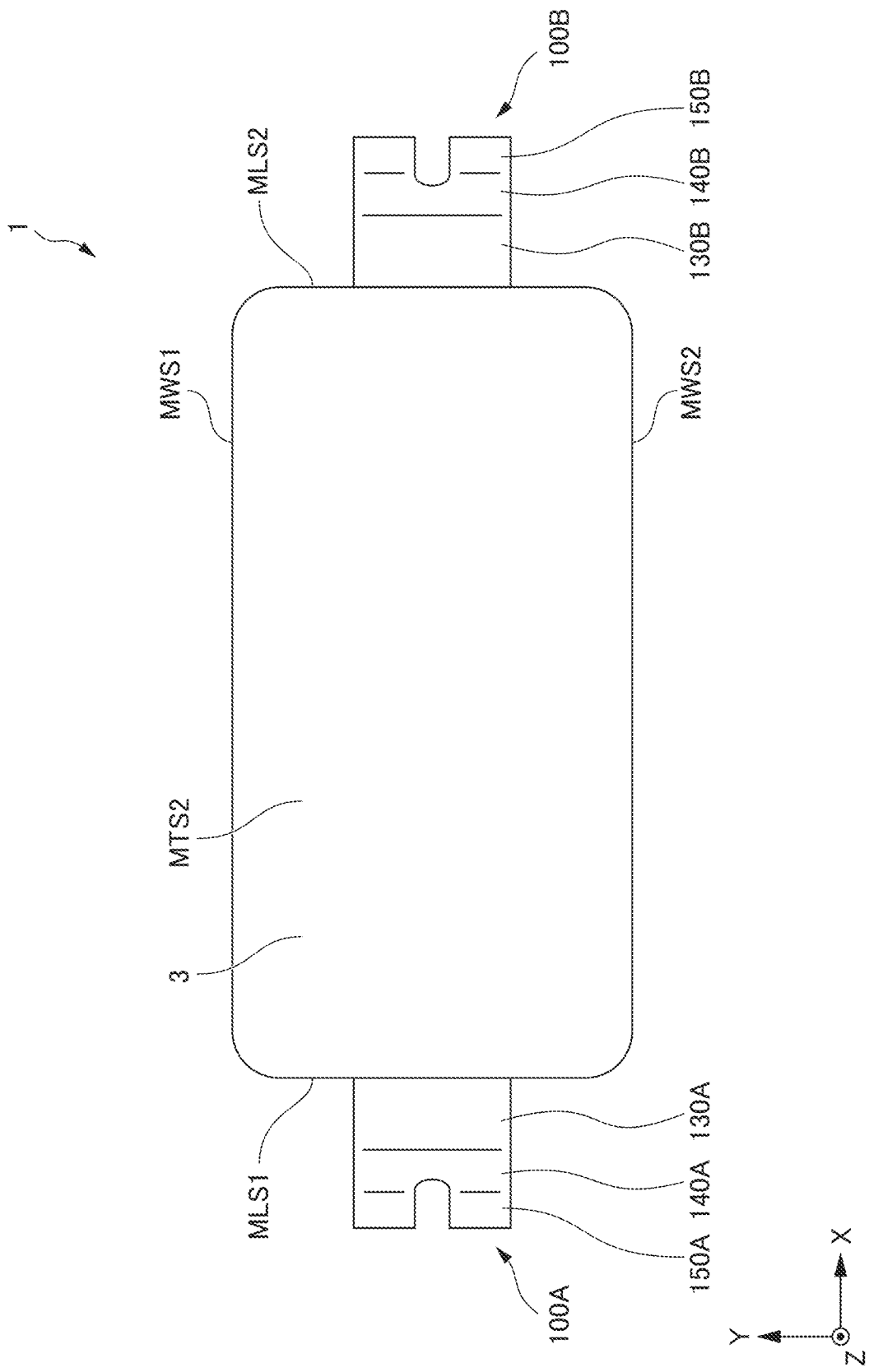
FIG. 4 is an arrow view when the multilayer ceramic capacitor of FIG. 2 is viewed in the direction of the arrow IV.
Figure 5:
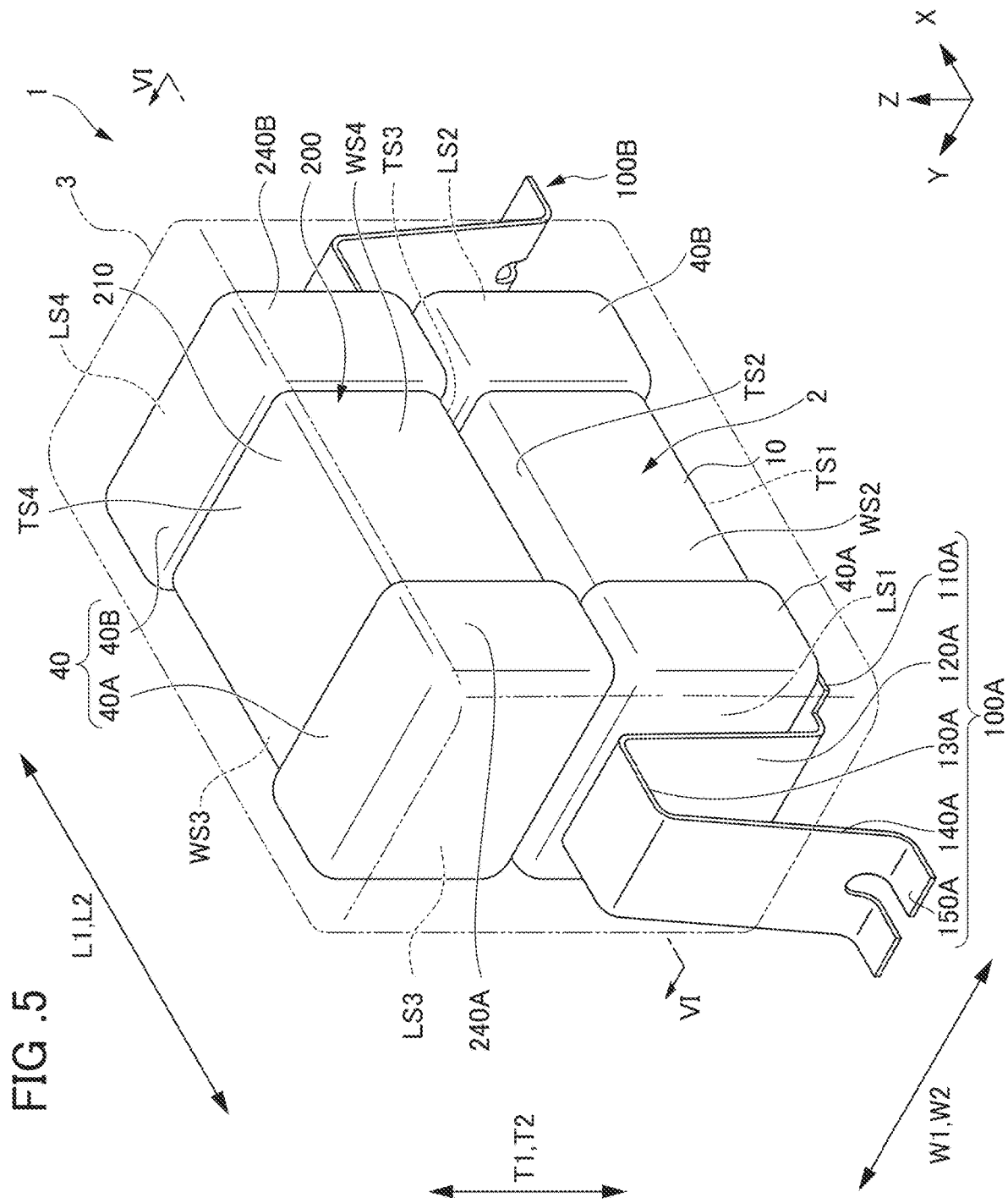
FIG. 5 is a view corresponding to FIG. 1, and is a virtual perspective view for explaining an internal configuration of the multilayer ceramic capacitor.
Figure 6:
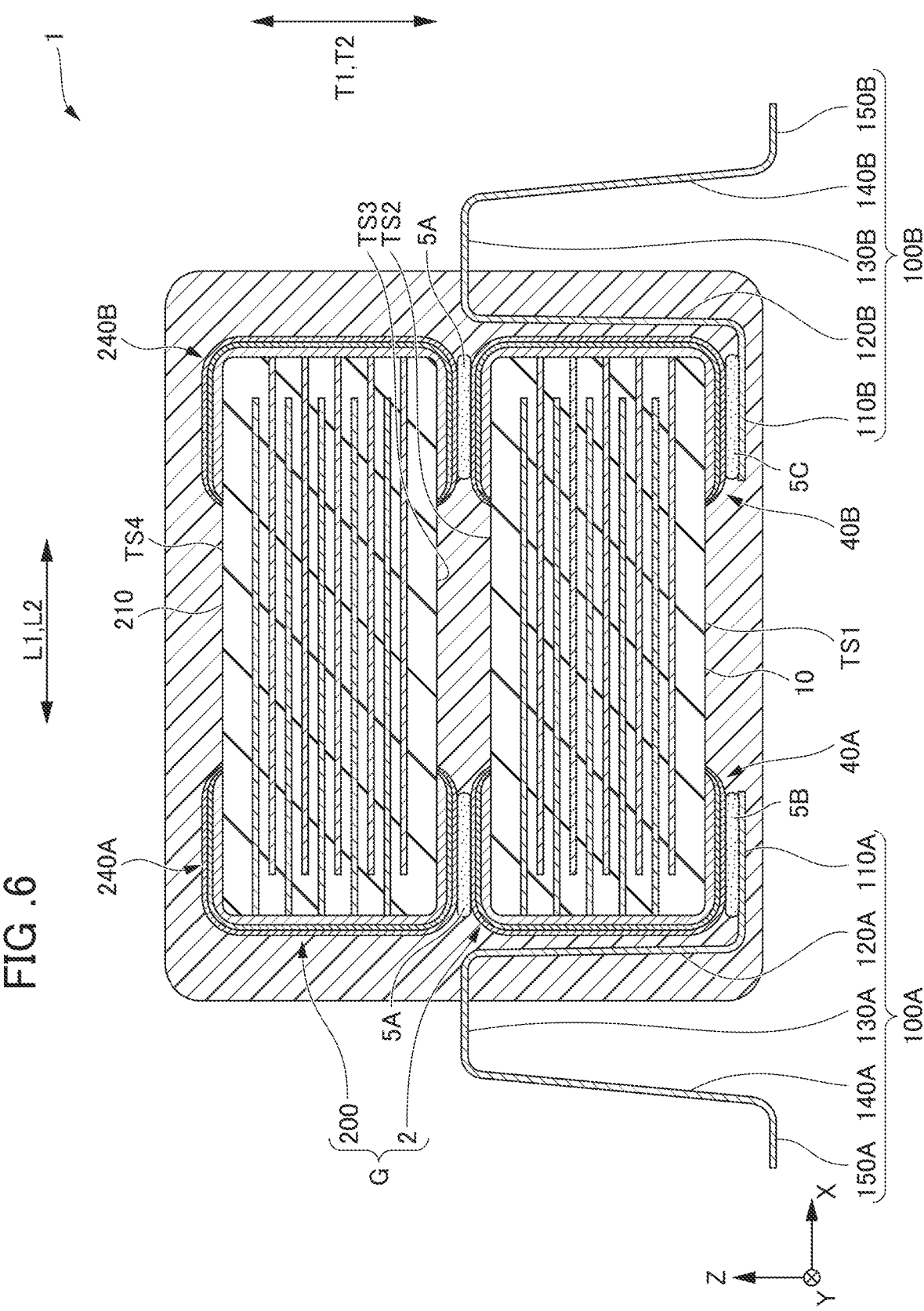
FIG. 6 is a cross-sectional view taken along the line VI-VI of the multilayer ceramic capacitor of FIG. 5.

Hereinafter, a multilayer ceramic capacitor 1 according to an example embodiment of the present invention will be described. FIG. 1 is an external perspective view of the multilayer ceramic capacitor 1. FIG. 2 is an arrow view when the multilayer ceramic capacitor 1 of FIG. 1 is viewed in the direction of the arrow II. FIG. 3 is an arrow view when the multilayer ceramic capacitor 1 of FIG. 2 is viewed in the direction of the arrow III. FIG. 4 is an arrow view when the multilayer ceramic capacitor 1 of FIG. 2 is viewed in the direction of the arrow IV. FIG. 5 is a view corresponding to FIG. 1, and is a virtual perspective view for explaining the internal configuration of the multilayer ceramic capacitor 1. FIG. 6 is a cross-sectional view taken along the line VI-VI of the multilayer ceramic capacitor 1 of FIG. 5.

The multilayer ceramic capacitor 1 defining and functioning as a multilayer ceramic electronic component includes a first multilayer ceramic capacitor main body 2 and a second multilayer ceramic capacitor main body 200 as multilayer ceramic electronic component main bodies, metal terminals 100, an exterior material 3, and a bonding material 5. Hereinafter, the first multilayer ceramic capacitor main body 2 and the second multilayer ceramic capacitor main body 200 may be referred to as "multilayer ceramic capacitor main bodies 2 and 200". The multilayer ceramic capacitor main bodies 2 and 200 are covered with the exterior material 3. Therefore, they are not shown in FIGS. 1 to 4. FIGS. 5 and 6 each show the multilayer ceramic capacitor main bodies 2 and 200.

Figure 7:
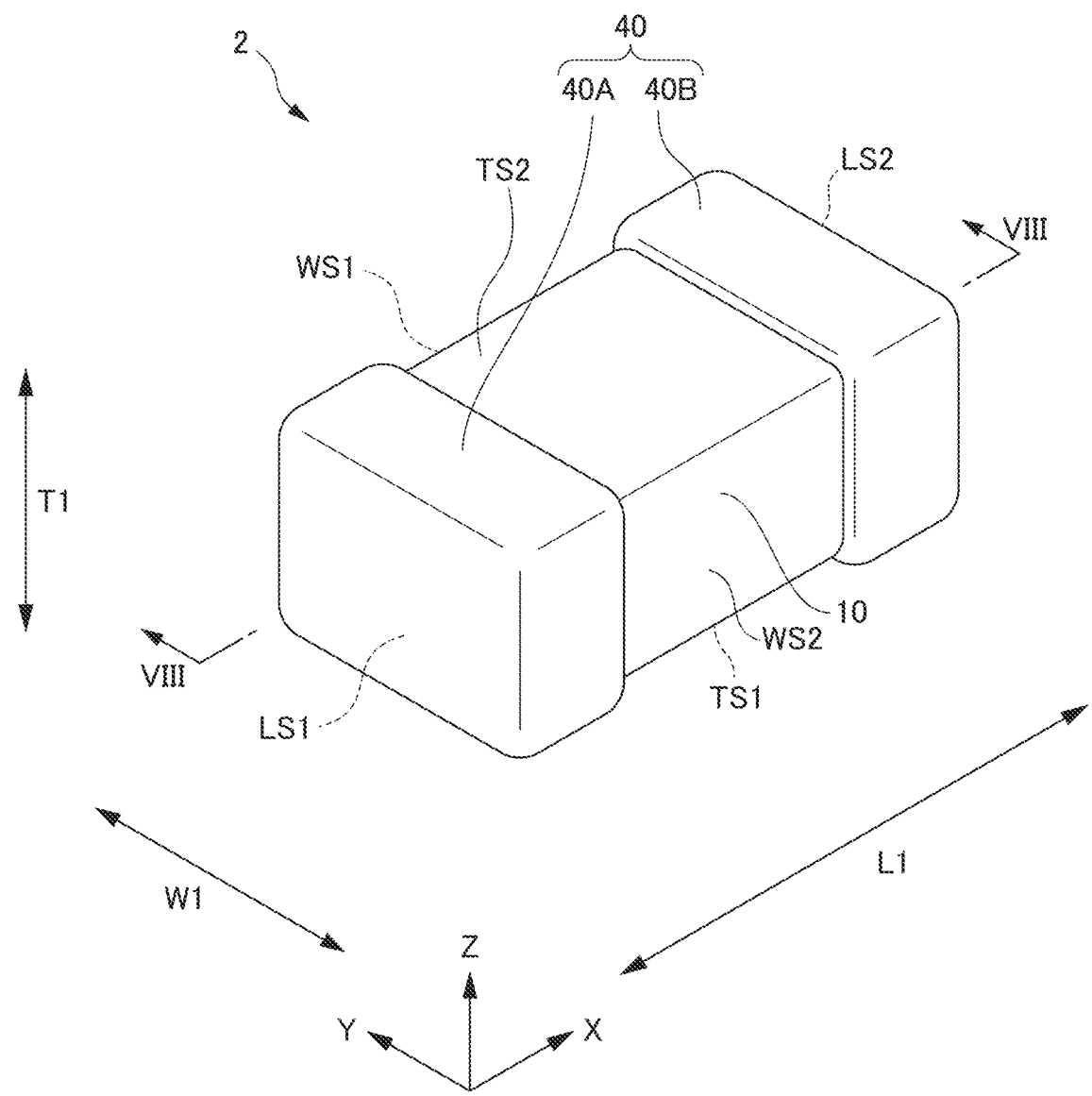
FIG. 7 is an external perspective view showing the appearance of a first multilayer ceramic capacitor main body before being covered with an exterior material and before a metal terminal is attached.
Figure 8:
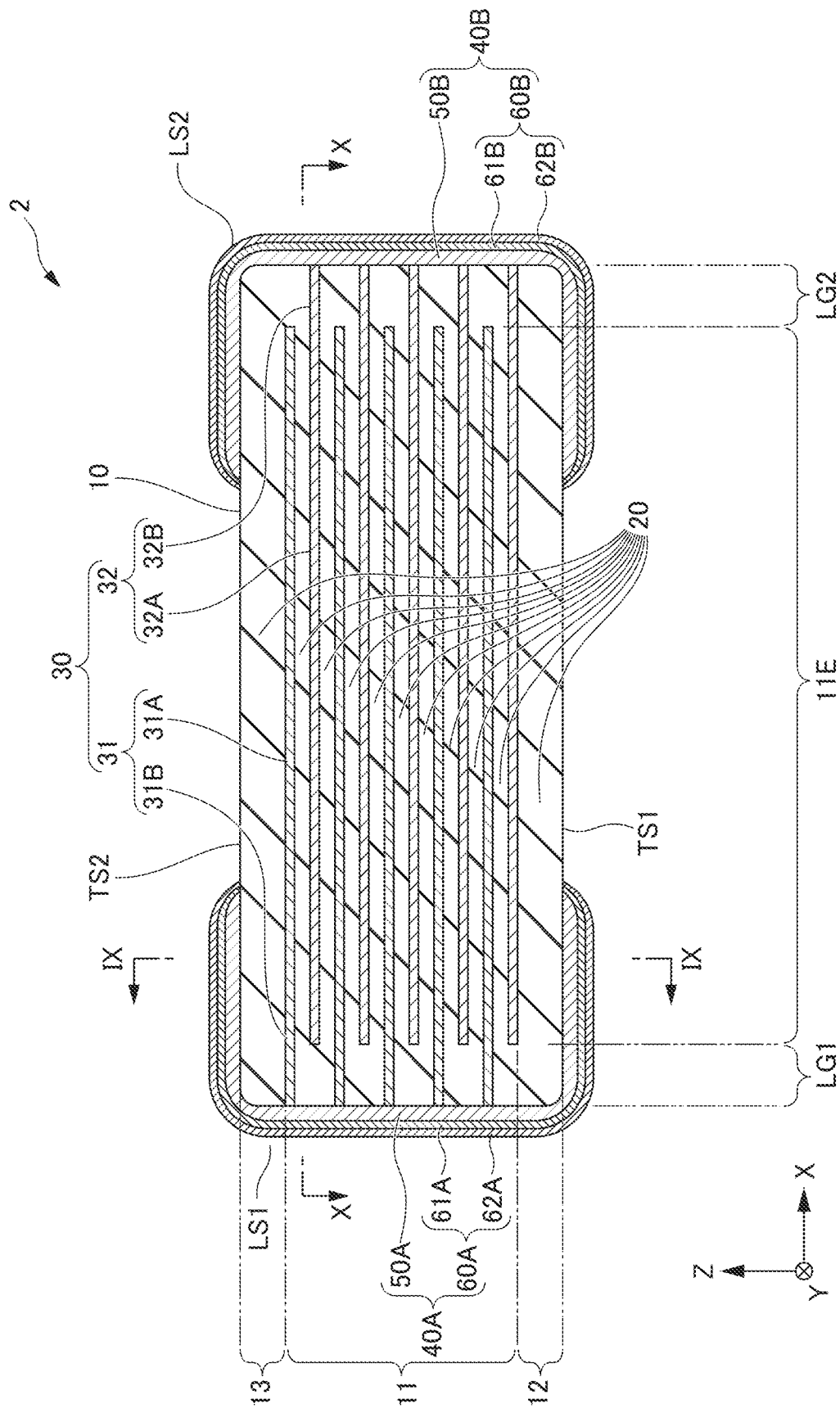
FIG. 8 is a cross-sectional view taken along the line VIII-VIII of the first multilayer ceramic capacitor main body of FIG. 7.
Figure 9:
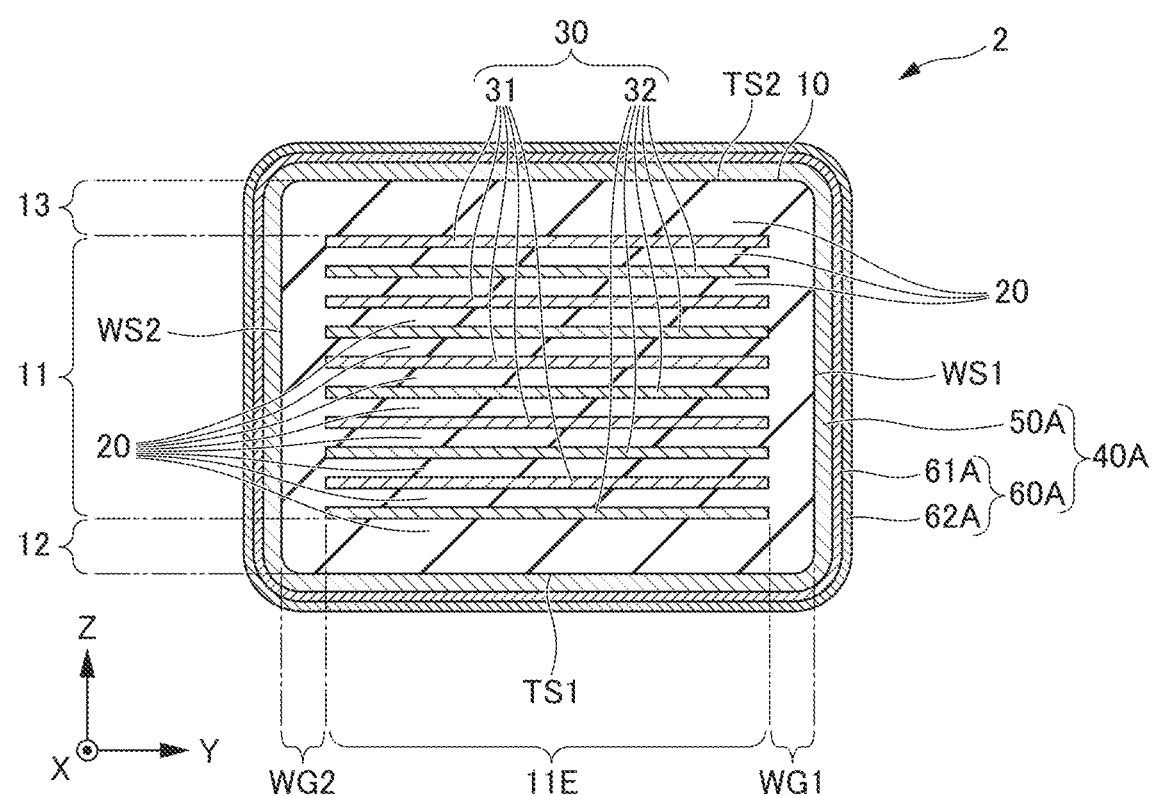
FIG. 9 is a cross-sectional view taken along the line IX-IX of the first multilayer ceramic capacitor main body of FIG. 8.
Figure 10:
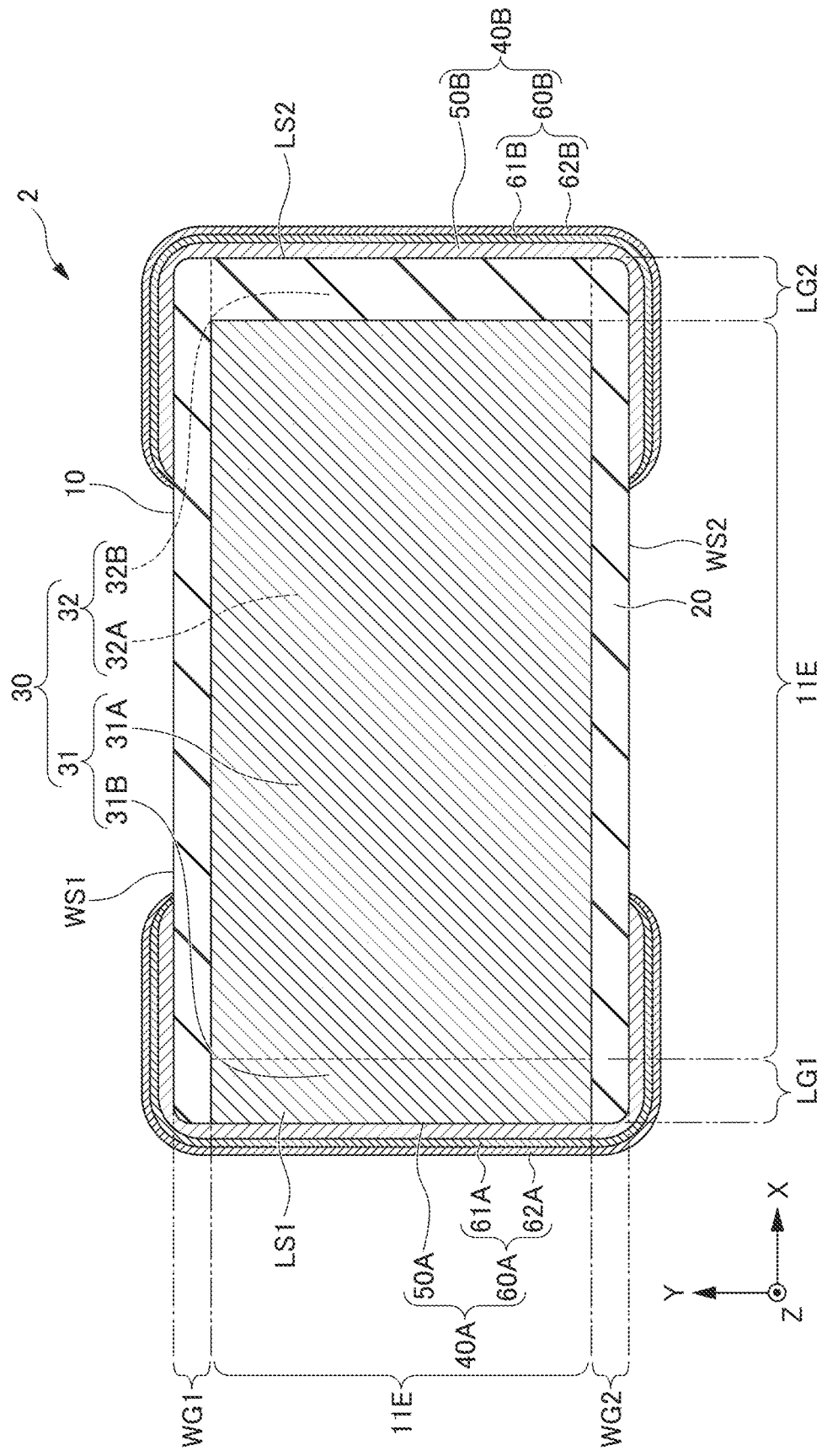
FIG. 10 is a cross-sectional view taken along the line X-X of the first multilayer ceramic capacitor main body of FIG. 8.

The first multilayer ceramic capacitor main body 2 will be described with reference to FIGS. 7 to 10 in addition to FIGS. 5 and 6. FIG. 7 is an external perspective view showing the appearance of the first multilayer ceramic capacitor main body 2 before being covered with the exterior material 3 and before the metal terminal 100 is attached. FIG. 8 is a cross-sectional view taken along the line VIII-VIII of the first multilayer ceramic capacitor main body 2 of FIG. 7. FIG. 9 is a cross-sectional view taken along the line IX-IX of the first multilayer ceramic capacitor main body 2 of FIG. 8. FIG. 10 is a cross-sectional view taken along the line X-X of the first multilayer ceramic capacitor main body 2 of FIG. 8.

The first multilayer ceramic capacitor main body 2 includes a capacitor multilayer body 10 defining and functioning as a first multilayer body and first external electrodes 40.

FIGS. 7 to 10 each show an XYZ Cartesian coordinate system. As shown in FIGS. 5 and 7, the length directions L1 of the first multilayer ceramic capacitor main body 2 and the capacitor multilayer body 10 correspond to the X direction.

The width directions W of the first multilayer ceramic capacitor main body 2 and the capacitor multilayer body 10 correspond to the Y direction. The lamination directions T of the first multilayer ceramic capacitor main body 2 and the capacitor multilayer body 10 correspond to the Z direction. Here, the cross section shown in FIG. 8 is also referred to as a cross section LT. The cross section shown in FIG. 9 is also referred to as a cross section WT. The cross section shown in FIG. 10 is also referred to as a cross section LW. A similar XYZ Cartesian coordinate system is also shown in FIGS. 1 to 6 and 11 to 13.

As shown in FIGS. 5 to 10, the capacitor multilayer body 10 includes a first main surface TS1 and a second main surface TS2 which are opposed to each other in the lamination (stacking) direction T1 in which the inner layer portion 11 described later is stacked, a first lateral surface WS1 and a second lateral surface WS2 which are opposed to each other in the width direction W1 orthogonal or substantially orthogonal to the lamination direction T1, and a first end surface LS1 and a second end surface LS2 which are opposed to each other in the length direction L1 orthogonal or substantially orthogonal to the lamination direction T1 and the width direction W1.

The capacitor multilayer body 10 has a rectangular or substantially rectangular parallelepiped shape. The dimension in the length direction L1 of the capacitor multilayer body 10 is not necessarily longer than the dimension in the width direction W1. The capacitor multilayer body 10 preferably includes rounded corner portions and rounded ridge portions. The corner portions are portions where the three surfaces of the multilayer body intersect, and the ridge portions are portions where the two surfaces of the multilayer body intersect. In addition, unevenness or the like may be provided on a portion or an entirety of the surface of the capacitor multilayer body 10.

The dimensions of the capacitor multilayer body 10 are not particularly limited, but the dimension in the length direction L1 of the capacitor multilayer body 10 is preferably, for example, about 0.2 mm or more and about 10 mm or less. The dimension of the capacitor multilayer body 10 in the lamination direction T1 is preferably, for example, about 0.1 mm or more and about 10 mm or less. The dimension of the capacitor multilayer body 10 in the width direction W1 is preferably, for example, about 0.1 mm or more and about 10 mm or less.

As shown in FIGS. 8 and 9, the multilayer body 10 includes an inner layer portion 11, and a first main surface-side outer layer portion 12 and a second main surface-side outer layer portion 13 sandwiching the inner layer portion 11 in the lamination direction T1. The inner layer portion 11 may also be referred to as an active layer portion.

The inner layer portion 11 includes a plurality of dielectric layers 20 defining and functioning as a plurality of first ceramic layers, and a plurality of internal electrode layers 30 defining and functioning as a plurality of first inner conductor layers. The inner layer portion 11 includes, in the lamination direction T1, a portion from the internal electrode layer 30 located closest to the first main surface TS1 to the internal electrode layer 30 located closest to the second main surface TS2. In the inner layer portion 11, the plurality of internal electrode layers 30 are opposed to each other with the dielectric layer 20 interposed therebetween. The inner layer portion 11 is a portion that generates a capacitance, and thus substantially defines and functions as a capacitor.

The plurality of dielectric layers 20 are made of a dielectric material. For example, the dielectric material may be a dielectric ceramic including a component such as $BaTiO_3$, $CaTiO_3$, $SrTiO_3$, or $CaZrO_3$. Furthermore, the dielectric material may be obtained by adding a second component such as, for example, a Mn compound, an Fe compound, a Cr compound, a Co compound, or a Ni compound to the main component.

The dielectric layers 20 each preferably have a thickness of, for example, about 0.5 µm or more and about 72 µm or less. The number of the dielectric layers 20 to be stacked (laminated) is preferably, for example, ten or more and 700 or less. The number of the dielectric layers 20 refers to the total number of dielectric layers in the inner layer portion 11, and dielectric layers in the first main surface-side outer layer portion 12 and the second main surface-side outer layer portion 13.

The plurality of internal electrode layers 30 include a plurality of first internal electrode layers 31 and a plurality of second internal electrode layers 32. The plurality of first internal electrode layers 31 are provided on the plurality of dielectric layers 20. The plurality of second internal electrode layers 32 are provided on the plurality of dielectric layers 20. The plurality of first internal electrode layers 31 and the plurality of second internal electrode layers 32 are alternately provided in the lamination direction T1 of the multilayer body 10 with the dielectric layers 20 interposed therebetween. The first internal electrode layers 31 and the second internal electrode layers 32 sandwich the dielectric layers 20.

The first internal electrode layer 31 includes a first counter portion 31A that is opposed to the second internal electrode layer 32, and a first extension portion 31B extending from the first counter portion 31A toward the first end surface LS1. The first extension portion 31B is exposed at the first end surface LS1.

The second internal electrode layer 32 includes a second counter portion 32A that is opposed to the first internal electrode layer 31, and a second extension portion 32B extending from the second counter portion 32A toward the second end surface LS2. The second extension portion 32B is exposed at the second end surface LS2.

In an example embodiment of the present invention, the first counter portion 31A and the second counter portion 32A are opposed to each other with the dielectric layer 20 interposed therebetween, such that a capacitance is generated, to provide the characteristics of a capacitor.

The shapes of the first counter portion 31A and the second counter portion 32A are not particularly limited. However, they are preferably, for example, rectangular or substantially rectangular. However, the corner portions of the rectangular or substantially rectangular shape may be rounded or slanted. The shapes of the first extension portion 31B and the second extension portion 32B are not particularly limited, but are preferably, for example, rectangular or substantially rectangular. However, the corner portions of the rectangular or substantially rectangular shape may be rounded or slanted.

The dimension in the width direction W1 of the first counter portion 31A and the dimension in the width direction W1 of the first extension portion 31B may be the same or substantially the same dimensions, or one of them may have a smaller dimension. The dimension in the width direction W1 of the second counter portion 32A and the dimension in the width direction W1 of the second extension portion 32B may be the same or substantially the same dimension, or one of them may have a narrower dimension.

The first internal electrode layer 31 and the second internal electrode layer 32 are each made of a metal such as, for example, Ni, Cu, Ag, Pd, or Au, or a suitable conductive material such as an alloy including at least one of these metals. In a case in which an alloy is used, the first internal electrode layer 31 and the second internal electrode layer 32 may be made of, for example, a Ag—Pd alloy.

The thickness of each of the first internal electrode layer 31 and the second internal electrode layer 32 is preferably, for example, about 0.2 µm or more and about 3.0 µm or less. The total number of the first internal electrode layers 31 and the second internal electrode layers 32 is preferably, for example, five or more and 350 or less.

The first main surface-side outer layer portion 12 is located on the first main surface TS1 side of the capacitor multilayer body 10. The first main surface-side outer layer portion 12 is an assembly including a plurality of dielectric layers 20 as ceramic layers located between the first main surface TS1 and the internal electrode layer 30 closest to the first main surface TS1. In other words, the first main surface-side outer layer portion 12 includes a plurality of dielectric layers 20 located between the first main surface TS1 and the internal electrode layer 30 located closest to the first main surface TS1 side among the plurality of internal electrode layers 30. The dielectric layers 20 used in the first main surface-side outer layer portion 12 may be the same as the dielectric layers 20 used in the inner layer portion 11.

The second main surface-side outer layer portion 13 is located on the second main surface TS2 side of the capacitor multilayer body 10. The second main surface-side outer layer portion 13 is an assembly including a plurality of dielectric layers 20 located between the second main surface TS2 and the internal electrode layer 30 closest to the second main surface TS2. In other words, the second main surface-side outer layer portion 13 includes a plurality of dielectric layers 20 located between the second main surface TS2 and the internal electrode layer 30 located closest to the second main surface TS2 side among the plurality of internal electrode layers 30. The dielectric layers 20 used in the second main surface-side outer layer portion 13 may be the same as the dielectric layers 20 used in the inner layer portion 11.

As described above, the capacitor multilayer body 10 includes the plurality of dielectric layers 20 and the plurality of internal electrode layers 30 laminated on the dielectric layer 20. That is, the multilayer ceramic capacitor 1 includes the capacitor multilayer body 10 including the dielectric layers 20 and the internal electrode layers 30 alternately laminated therein.

The capacitor multilayer body 10 includes a counter electrode portion 11E. The counter electrode portion 11E refers to a portion where a first counter portion 31A of the first internal electrode layer 31 and a second counter portion 32A of the second internal electrode layer 32 are opposed to each other. The counter electrode portion 11E defines and functions as a portion of the inner layer portion 11. FIG. 8 shows the range of the counter electrode portion 11E in the length direction L. FIG. 9 shows the range of the counter electrode portion 11E in the width direction W1. FIG. 10 shows the ranges of the width direction W1 and the length direction L1 of the counter electrode portion 11E. The counter electrode portion 11E is also referred to as a capacitor active portion.

The capacitor multilayer body 10 includes a lateral surface-side outer layer portion. The lateral surface-side outer layer portion includes a first lateral surface-side outer layer portion WG1 and a second lateral surface-side outer layer portion WG2. The first lateral surface-side outer layer portion WG1 includes the dielectric layers 20 located between the counter electrode portion 11E and the first lateral surface WS1. The second lateral surface-side outer layer portion WG2 includes the dielectric layers 20 located between the counter electrode portion 11E and the second lateral surface WS2. FIG. 9 and FIG. 10 each show the ranges in the width direction W1 of the first lateral surface-side outer layer portion WG1 and the second lateral surface-side outer layer portion WG2. The first lateral surface-side outer layer portion WG1 and the second lateral surface-side outer layer portion WG2 are also referred to as W gaps or side gaps.

The capacitor multilayer body 10 includes an end surface-side outer layer portion. The end surface-side outer layer portion includes a first end surface-side outer layer portion LG1 and a second end surface-side outer layer portion LG2. The first end surface-side outer layer portion LG1 includes the dielectric layers 20 located between the counter electrode portion 11E and the first end surface LS1, and the first extension portions 31B. The second end surface-side outer layer portion LG2 includes the dielectric layers 20 located between the counter electrode portion 11E and the second end surface LS2, and the second extension portion 32B. FIG. 8 and FIG. 10 each show the ranges in the length direction L of the first end surface-side outer layer portion LG1 and the second end surface-side outer layer portion LG2. The first end surface-side outer layer portion LG1 and the second end surface-side outer layer portion LG2 are also referred to as L gaps or side gaps.

The first external electrode 40 includes a first external electrode 40A provided on the first end surface LS1 side and a first external electrode 40B provided on the second end surface LS2 side.

The first external electrode 40A is provided at least on the first end surface LS1, a portion on the first main surface TS1, and a portion on the second main surface TS2. In an example embodiment of the present invention, the first external electrode 40A is provided on the first end surface LS1, a portion of the first main surface TS1, a portion of the second main surface TS2, a portion of the first lateral surface WS1, and a portion of the second lateral surface WS2. Furthermore, in an example embodiment of the present invention, the first external electrode 40A is connected to the first internal electrode layers 31 on the first end surface LS1. Furthermore, for example, the first external electrode 40A may extend from the first end surface LS1 to a portion of the first main surface TS1. In other words, the cross-section of the first external electrode 40A may have an L shape (not shown). The portion provided on the first main surface TS1 of the first external electrode 40A is connected to a first metal terminal 100A described later via a first bonding material 5A described later.

In a case in which the first external electrode 40A is provided on the first main surface TS1, the second main surface TS2, the first lateral surface WS1, and the second lateral surface WS2, the length in the length direction L1 of the first external electrode 40A provided on these surfaces is also preferably, for example, about 10% or more and about 40% or less (for example, about 20 µm or more and about 4000 µm or less) of the dimension in the length direction L1 of the capacitor multilayer body 10.

In a case in which the first external electrode 40A is also provided on the first main surface TS1 and the second main surface TS2, the length in the width direction W1 of the first external electrode 40A provided on these surface is preferably a dimension equal or substantially equal to the dimension in the width direction W1 of the capacitor multilayer body 10 (for example, about 0.1 mm or more and about 10 mm or less). Furthermore, in a case in which the first external electrode 40A is provided on the first lateral surface WS1 and the second lateral surface WS2, the length in the lamination direction T1 of the first external electrode 40A provided on these portions is preferably a dimension equal or substantially equal to the dimension in the lamination direction T1 of the capacitor multilayer body 10 (for example, about 0.1 mm or more and about 10 mm or less).

The first external electrode 40B is provided at least on the second end surface LS2, a portion on the first main surface TS1, and a portion on the second main surface TS2. In the example embodiment of the present invention, the first external electrode 40B is provided on the second end surface LS2, a portion of the first main surface TS1, a portion of the second main surface TS2, a portion of the first lateral surface WS1, and a portion of the second lateral surface WS2. Furthermore, in the example embodiment of the present invention, the first external electrode 40A is connected to the second internal electrode layers 32 on the second end surface LS2. Furthermore, for example, the first external electrode 40B may extend from the second end surface LS2 to a portion of the first main surface TS1. In other words, the cross-section of the first external electrode 40B may have an L shape (not shown).

In a case in which the first external electrode 40B is provided on the first main surface TS1, the second main surface TS2, the first lateral surface WS1, and the second lateral surface WS2, the length in the length direction L1 of the second external electrode 40B provided on these surfaces is also preferably, for example, about 10% or more and about 40% or less (for example, about 20 μm or more and about 4000 μm or less) of the dimension in the length direction L1 of the capacitor multilayer body 10. In a case in which the first external electrode 40B is also provided on the first main surface TS1 and the second main surface TS2, the length in the width direction W1 of the second external electrode 40B provided on these surfaces is preferably a dimension equal or substantially equal to the dimension in the width direction W1 of the capacitor multilayer body 10 (for example, about 0.1 mm or more and about 10 mm or less). Furthermore, in a case in which the first external electrode 40B is provided on the first lateral surface WS1 and the second lateral surface WS2, the length in the lamination direction T1 of the second external electrode 40B provided on these portions is preferably a dimension equal or substantially equal to the dimension in the lamination direction T1 of the capacitor multilayer body 10 (for example, about 0.1 mm or more and about 10 mm or less).

In the example embodiment of the present invention, the length in the length direction L1 of the portion of the surface of the capacitor multilayer body 10 exposed from the external electrode 40 is preferably, for example, about 20% or more and about 80% or less (for example, about 40 μm or more and about 8000 μm or less) of the dimension in the length direction L1 of the multilayer body. In other words, the separation distance between the first external electrode 40A and the first external electrode 40B is preferably, for example, about 20% or more and about 80% or less (for example, about 40 μm or more and about 8000 μm or less) of the dimension in the length direction L1 of the multilayer body.

As described above, in the capacitor multilayer body 10, the capacitance is generated by the first counter portions 31A of the first internal electrode layers 31 and the second counter portions 32A of the second internal electrode layers 32 being opposed to each other with the dielectric layers 20 interposed therebetween. Therefore, the characteristics of the capacitor are developed between the first external electrode 40A to which the first internal electrode layers 31 are connected and the first external electrode 40B to which the second internal electrode layers 32 are connected.

The first external electrode 40A includes a first base electrode layer 50A and a first plated layer 60A provided on the first base electrode layer 50A.

The first external electrode 40B includes a second base electrode layer 50B and a second plated layer 60B provided on the second base electrode layer 50B.

The first base electrode layer 50A is provided on the first end surface LS1. The first base electrode layer 50A is connected to the first internal electrode layer 31. In an example embodiment of the present invention, the first base electrode layer 50A extends from the first end surface LS1 to a portion of the first main surface TS1 and to a portion of the second main surface TS2, and to a portion of the first lateral surface WS1 and to a portion of the second lateral surface WS2.

The second base electrode layer 50B is provided on the second end surface LS2. The second base electrode layer 50B is connected to the second internal electrode layer 32. In an example embodiment of the present invention, the second base electrode layer 50B extends from the second end surface LS2 to a portion of the first main surface TS1 and to a portion of the second main surface TS2, and to a portion of the first lateral surface WS1 and to a portion of the second lateral surface WS2.

In an example embodiment of the present invention, the first base electrode layer 50A and the second base electrode layer 50B are each a fired layer. The fired layer preferably includes a metal component and either a glass component or a ceramic component, or alternatively, a metal component and both a glass component and a ceramic component. The metal component includes, for example, at least one of Cu, Ni, Ag, Pd, Ag—Pd alloys, and Au. The glass component includes, for example, at least one of B, Si, Ba, Mg, Al, and Li. As the ceramic component, a ceramic material of the same type as that of the dielectric layer 20 may be used, or a ceramic material of a different kind may be used. The ceramic component includes, for example, at least one of $BaTiO_3$, $CaTiO_3$, $(Ba, Ca) TiO_3$, $SrTiO_3$, and $CaZrO_3$.

The fired layer is obtained by applying a conductive paste including glass and metal to the multilayer body, and then firing. The fired layer may be obtained by simultaneously firing a laminated (multilayer) chip including the internal electrode layers and the dielectric layers, and a conductive paste applied to the multilayer chip, or alternatively may be obtained by firing the multilayer chip including the internal electrode layers and the dielectric layers to thus provide a multilayer body, followed by the conductive paste being applied to the multilayer body, and then firing being performed. In a case in which the multilayer chip including the internal electrode layers and the dielectric layers, and the conductive paste applied to the multilayer chip are fired simultaneously, it is preferable that the firing layer is formed by firing a material to which a ceramic material is added instead of the glass component. In this case, it is particularly preferable to use the same type of ceramic material as the dielectric layer 20 as the ceramic material to be added. Furthermore, the fired layer may include a plurality of layers.

The thickness in the length direction of the first base electrode layer 50A located on the first end surface LS1 is preferably, for example, about 10 μm or more and about 200 μm or less at the middle portion in the lamination direction T and the width direction W of the first base electrode layer 50A.

The thickness in the length direction of the second base electrode layer 50B located on the second end surface LS2 is preferably, for example, about 10 μm or more and about 200 μm or less at the middle portion in the lamination direction T and the width direction W of the second base electrode layer 50B.

In a case in which the first base electrode layer 50A is provided on a portion of the surface of at least the first main surface TS1 or the second main surface TS2, it is preferable that the thickness in the lamination direction T1 of the first base electrode layer 50A provided on this portion is, for example, about 5 μm or more and about 40 μm or less at the middle portion in the length direction L1 and the width direction W1 of the first base electrode layer 50A provided on this portion.

In a case in which the first base electrode layer 50A is provided on a portion of the surface of at least the first lateral surface WS1 or the second lateral surface WS2, it is preferable that the thickness in the width direction W1 of the first base electrode layer 50A provided on this portion is, for example, about 5 μm or more and about 40 μm or less at the middle portion in the length direction L1 and the lamination direction T1 of the first base electrode layer 50A provided on this portion.

In a case in which the second base electrode layer 50B is provided on a portion of the surface of at least the first main surface TS1 or the second main surface TS2, it is preferable that the thickness in the lamination direction T1 of the second base electrode layer 50B provided on this portion is, for example, about 5 μm or more and about 40 μm or less at the middle portion in the length direction L1 and the width direction W1 of the second base electrode layer 50B provided on this portion.

In a case in which the second base electrode layer 50B is provided on a portion of the surface of at least the first lateral surface WS1 or the second lateral surface WS2, it is preferable that the thickness in the width direction W1 of the second base electrode layer 50B provided on this portion is, for example, about 5 μm or more and about 40 μm or less at the middle portion in the length direction L1 and the lamination direction T1 of the second base electrode layer 50B provided on this portion.

The first base electrode layer 50A and the second base electrode layer 50B are not limited to the fired layer, and each may be a thin film layer. The thin film layer is a layer in which metal particles are deposited, and which is formed by a thin film forming method such as, for example, a sputtering method or a deposition method. The thin film layer preferably includes, for example, at least one metal selected from Mg, Al, Ti, W, Cr, Cu, Ni, Ag, Co, Mo, and V. Thus, it is possible to increase the adhesion force of the external electrodes 40 to the capacitor multilayer body 10. The thin film layer may be a single layer or may include a plurality of layers. For example, the thin film layer may include a two-layer configuration including a layer of NiCr and a layer of NiCu.

For example, in a case in which the thin film layer as a base electrode is formed by a sputtering electrode by a sputtering method, the sputtering electrode is preferably formed on a portion of the first main surface TS1 and on a portion of the second main surface TS2 of the capacitor multilayer body 10. The sputtering electrode preferably includes at least one of Ni, Cr, and Cu, for example. The thickness of the sputtering electrode is preferably, for example, about 50 nm or more and about 400 nm or less, and more preferably about 50 nm or more and about 130 nm or less.

As the base electrode layer, a sputtering electrode may be formed on a portion of the first main surface TS1 and on a portion of the second main surface TS2 of the capacitor multilayer body 10, while a fired layer may be formed on the first end surface LS1 and the second end surface LS2. Alternatively, the base electrode layer may not be formed on the first end surface LS1 and the second end surface LS2, and a plated layer, which will be described later, may be formed directly on the capacitor multilayer body 10. In addition, in a case in which a fired layer is formed on the first end surface LS1 and the second end surface LS2, the fired layer may be provided not only on the first end surface LS1 and the second end surface LS2, but also on a portion of the first main surface TS1 and on a portion of the second main surface TS2. In this case, the sputtering electrode may overlap the fired layer.

The first plated layer 60A covers the first base electrode layer 50A.

The second plated layer 60B covers the second base electrode layer 50B.

The first plated layer 60A and the second plated layer 60B may include at least one of Cu, Ni, Sn, Ag, Pd, Ag—Pd alloy, and Au, for example. Each of the first plated layer 60A and the second plated layer 60B may include a plurality of layers. The first plated layer 60A and the second plated layer 60B are preferably, for example, a two-layer configuration including a Sn-plated layer provided on the Ni-plated layer.

The first plated layer 60A covers the first base electrode layer 50A. In an example embodiment of the present invention, for example, the first plated layer 60A includes a first Ni-plated layer 61A and a first Sn-plated layer 62A located on the first Ni-plated layer 61A.

The second plated layer 60B covers the second base electrode layer 50B. In an example embodiment of the present invention, for example, the second plated layer 60B includes a second Ni-plated layer 61B and a second Sn-plated layer 62B located on the second Ni-plated layer 61B.

The Ni-plated layer prevents the first base electrode layer 50A and the second base electrode layer 50B from being eroded by solder as the bonding material 5 (to be described later) for bonding the first multilayer ceramic capacitor main body 2 and the metal terminal 100. Furthermore, the Sn-plated layer improves the wettability of the solder as the bonding material 5 (to be described later) for bonding the first multilayer ceramic capacitor main body 2 and the metal terminal 100. This facilitates the bonding of the first multilayer ceramic capacitor main body 2 and the metal terminal 100. In a case in which each of the first plated layer 60A and the second plated layer 60B is a two-layer configuration of the Ni-plated layer and the Sn-plated layer, the thickness of each of the Ni-plated layer and the Sn-plated layer is preferably, for example, about 1 μm or more and about 15 μm or less.

Furthermore, the first external electrode 40A and the first external electrode 40B of an example embodiment of the present invention may each include a conductive resin layer including, for example, conductive particles and a thermosetting resin. In a case in which the conductive resin layer is provided as the base electrode layer (the first base electrode layer 50A, the second base electrode layer 50B), the conductive resin layer may cover the free layer or may be provided directly on the capacitor multilayer body 10 without providing the free layer. In a case in which the conductive resin layer covers the fired layer, the conductive resin layer is provided between the fired layer and the plated layer (the first plated layer 60A, the second plated layer 60B). The conductive resin layer may completely cover the fired layer or may partially cover the fired layer.

The conductive resin layer including a thermosetting resin is more flexible than a conductive layer made of, for example, a plating film or a fired product of a conductive paste. Therefore, even when an impact caused by physical shock or thermal cycle to the multilayer ceramic capacitor 1 is applied, the conductive resin layer defines and functions as a buffer layer. Accordingly, crack generation in the multilayer ceramic capacitor 1 is reduced or prevented by the conductive resin layer.

The metal of the conductive particles may be, for example, Ag, Cu, Ni, Sn, Bi, or an alloy including them. The conductive particles preferably include Ag, for example. The conductive particles are metal powders of Ag, for example. Ag is suitable for an electrode material because of having the lowest specific resistance among metals. Since Ag is a noble metal, it hardly oxidizes and the weatherability is high. Therefore, the metal powder of Ag is suitable as conductive particles.

Furthermore, the conductive particles may be a metal powder in which the surface of the metal powder is coated with Ag. In a case in which the metal powder coated with Ag is used, the metal powder is preferably Cu, Ni, Sn, Bi or an alloy powder thereof. In order to make the metal of the base material inexpensive while maintaining the Ag characteristics, it is preferable, for example, to use a metal powder coated with Ag.

Furthermore, the conductive particles may be formed by subjecting Cu or Ni to an oxidation prevention treatment. The conductive particles may be a metal powder obtained by coating the surface of the metal powder with, for example, Sn, Ni, or Cu. In a case in which the metal powder coated with Sn, Ni, or Cu is used, the metal powder is preferably, for example, Ag, Cu, Ni, Sn, or Bi or an alloy powder thereof.

The shape of the conductive particles is not particularly limited. The conductive particles may have, for example, a spherical shape, a flat shape, or the like. However, it is preferable to use a mixture of spherical and flat metal powders.

The conductive particles included in the conductive resin layer mainly secures the electric conductivity of the conductive resin layer. More specifically, the plurality of conductive particles are brought into contact with each other to provide a current-carrying path inside the conductive resin layer.

The resin of the conductive resin layer may include, for example, at least one of various known thermosetting resins such as epoxy resin, phenol resin, urethane resin, silicone resin, and polyimide resin. Among them, epoxy resins that are excellent in heat resistance, moisture resistance, adhesiveness and the like are preferable resins. Furthermore, the resin of the conductive resin layer preferably includes a curing agent together with the thermosetting resin. In a case in which an epoxy resin is used as the base resin, the curing agent of the epoxy resin may be any of various known compounds such as, for example, phenolic, amine-based, acid anhydride-based, imidazole-based, active ester-based, and amideimide-based compounds.

In addition, the conductive resin layer may include a plurality of layers. The thickness of the thickest portion of the conductive resin layer is preferably, for example, about 10 μm or more and about 150 μm or less.

In addition, the first plated layer 60A and the second plated layer 60B (to be described later) may be directly provided on the capacitor multilayer body 10 without providing the first base electrode layer 50A and the second base electrode layer 50B. In other words, the multilayer ceramic capacitor 1 may include a plated layer that is electrically connected directly to the first internal electrode layers 31 and the second internal electrode layers 32. In such a case, a plated layer may be formed after placing a catalyst on the surface of the capacitor multilayer body 10 as a pretreatment.

Also in this case, the plated layer preferably includes a plurality of layers. Each of a lower plated layer and an upper plated layer preferably includes, for example, at least one of Cu, Ni, Sn, Pb, Au, Ag, Pd, Bi, Zn, and the like, or an alloy including these metals. The lower plated layer is more preferably, for example, made using Ni having solder barrier performance. The upper plated layer is more preferably, for example, made using Sn or Au having good solder wettability. Furthermore, in a case in which, for example, the first internal electrode layers 31 and the second internal electrode layers 32 are made using Ni, it is preferable that the lower plated layer is made using Cu having good bonding property with Ni. In addition, the upper plated layer may be provided as necessary, and the external electrode 40 may only include the lower plated layer. Furthermore, in the plated layers, the upper plated layer may be the outermost layer, or another plated layer may be further provided on the surface of the upper plated layer.

The thickness per layer of the plated layer without providing the base electrode layer is preferably, for example, about 2 μm or more and about 10 μm or less. The plated layer preferably does not include glass. The proportion of metal per unit volume of the plated layer is preferably, for example, about 99% by volume or more.

In a case in which the plated layer is provided directly on the capacitor multilayer body 10, it is possible to reduce the thickness of the base electrode layer. Therefore, it is possible to reduce the dimension in the lamination direction T1 of the first multilayer ceramic capacitor main body 2 by the amount of the reduction in thickness of the base electrode layer, thus reducing the height of the first multilayer ceramic capacitor main body 2. Alternatively, it is possible to increase the thickness of the dielectric layers 20 sandwiched between the first internal electrode layers 31 and the second internal electrode layers 32 by the amount of the reduction in thickness of the base electrode layer, thereby improving the thickness of the base body. In this way, by providing the plated layer directly on the capacitor multilayer body 10, it is possible to improve the degree of freedom in designing the multilayer ceramic capacitor.

The dimension in the length direction L1 of the first multilayer ceramic capacitor main body 2 including the capacitor multilayer body 10 and the external electrode 40 is preferably, for example. About 0.2 mm or more and about 10 mm or less. Further, the dimension in the lamination direction T1 of the first multilayer ceramic capacitor main body 2 is preferably, for example, about 0.1 mm or more and about 10 mm or less. Further, the dimension in the width direction W1 of the first multilayer ceramic capacitor main body 2 is preferably, for example, about 0.1 mm or more and about 10 mm or less.

Figure 11:
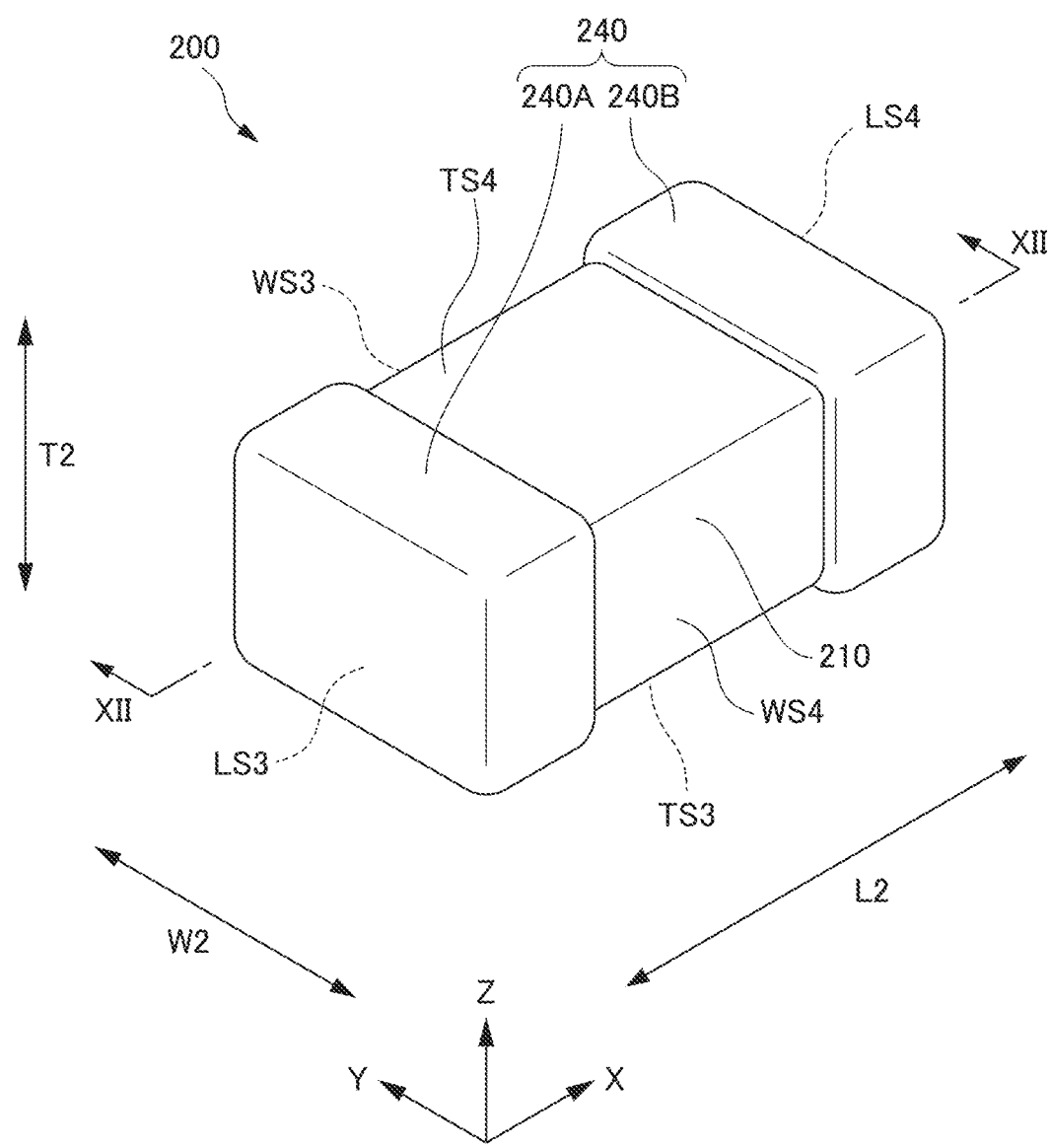
FIG. 11 is an external perspective view showing the appearance of a second multilayer ceramic capacitor main body before being covered with an exterior material and before a metal terminal is attached.
Figure 12:
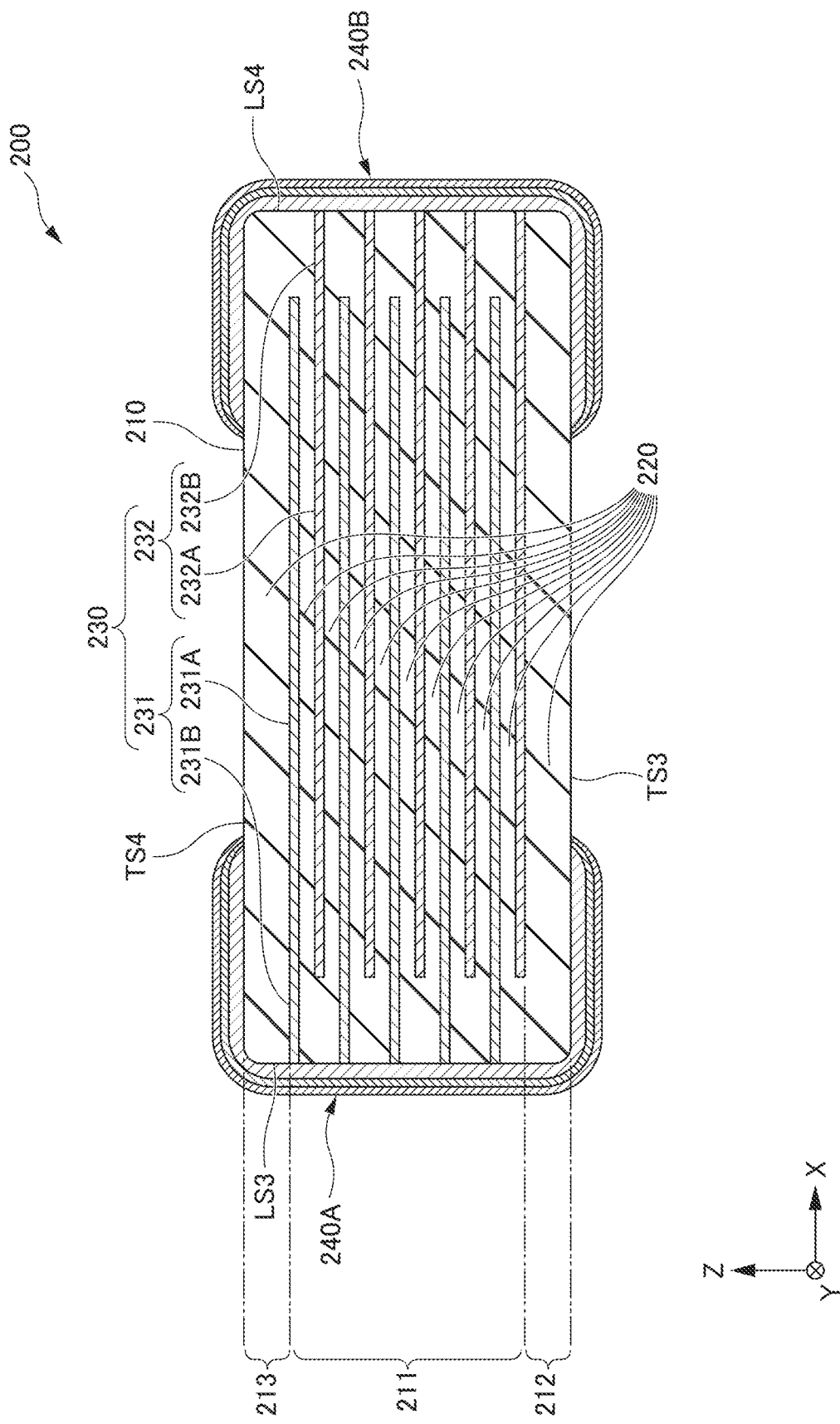
FIG. 12 is a cross-sectional view taken along the line XII-XII of the second multilayer ceramic capacitor main body of FIG. 11.

Next, the second multilayer ceramic capacitor main body 200 will be described with reference to FIGS. 11 and 12 in addition to FIGS. 5 and 6. FIG. 11 is an external perspective view of the appearance of the second multilayer ceramic capacitor main body 200 before being covered with the exterior material 3 and before the metal terminal 100 is attached. FIG. 12 is an LT cross-sectional view taken along line XII-XII of the second multilayer ceramic capacitor main body 200 of FIG. 11. The configuration of the second multilayer ceramic capacitor main body 200 is the same as or similar to that of the first multilayer ceramic capacitor main body 2. Therefore, a detailed description of the configuration of the second multilayer ceramic capacitor main body 200 is omitted. The dimensions of the second multilayer ceramic capacitor main body 200 are the same or substantially the same as the dimensions of the first multilayer ceramic capacitor main body 2.

The second multilayer ceramic capacitor main body 200 includes a capacitor multilayer body 210 defining and functioning as a second multilayer body and second external electrodes 240. The capacitor multilayer body 210 includes a third main surface TS3 and a fourth main surface TS4 opposed to each other in the lamination direction T2, in which the inner layer portion 211 described later is laminated, a third lateral surface WS3 and a fourth lateral surface WS4 opposed to each other in the width direction W2 orthogonal or substantially orthogonal to the lamination direction T2, and a third end surface LS3 and a fourth end surface LS4 opposed to each other in the length direction L3 orthogonal or substantially orthogonal to the lamination direction T2 and the width direction W2.

The capacitor multilayer body 210 includes the inner layer portion 211 and a third main surface-side outer layer portion 212 and a fourth main surface-side outer layer portion 213 sandwiching the inner layer portion 211 in the lamination direction T2. The inner layer portion 211 includes a plurality of dielectric layers 220 defining and functioning as a plurality of second ceramic layers and a plurality of internal electrode layers 230 defining and functioning as a plurality of second internal conductive layers. The plurality of internal electrode layers 230 includes a plurality of third internal electrode layers 231 and a plurality of fourth internal electrode layers 232. The third internal electrode layers 231 each include a third counter portion 231A opposed to the fourth internal electrode layer 232, and a third extension portion 231B extending from the third counter portion 231A toward the first end surface LS1. The fourth internal electrode layers 232 each include a fourth counter portion 232A opposed to the third internal electrode layer 231, and a fourth extension portion 232B extending from the fourth counter portion 232A toward the second end surface LS2.

The second external electrodes 240 include a second external electrode 240A provided on the third end surface LS3 side and a second external electrode 240B provided on the fourth end surface LS4 side.

The configurations of the multilayer ceramic capacitor main bodies 2 and 200 may be different from each other. The dimensions of the multilayer ceramic capacitor main bodies 2 and 200 may be different from each other. The second external electrode 240B is provided on the fourth end surface LS4 side.

Although each of the multilayer ceramic capacitor main bodies 2 and 200 is a multilayer ceramic capacitor main body having a two-portion configuration, the multilayer ceramic capacitor main body may include floating internal electrode layers, each defining and functioning as an internal electrode layer which does not extend toward any of the end surfaces TS, or may be a multilayer ceramic capacitor main body having a three-portion configuration or a multilayer ceramic capacitor main body having a multiple-portion configuration such as a four or more-portion structure.

The multilayer ceramic electronic component is not limited to a multilayer ceramic capacitor. For example, the multilayer ceramic electronic component may be a multilayer PCT thermistor. Further, the first multilayer ceramic electronic component main bodies may be different from each other, and for example, the first multilayer ceramic electronic component main body may be a multilayer ceramic capacitor main body and the second multilayer ceramic capacitor main body may be a multilayer PCT thermistor body.

As shown in FIGS. 5 and 6, the second multilayer ceramic capacitor main body 200 is provided on the second main surface TS2 side of the first multilayer ceramic capacitor main body 2. In each of the multilayer ceramic capacitor main bodies 2 and 200, the lamination direction T1 and the lamination direction T2 are the same direction, the width direction W1 and the width direction W2 are the same direction, and the length direction T1 and the length direction T2 are the same direction. In this case, the lamination direction T2 and the Z direction are the same direction, the width direction W2 and the Y direction are the same direction, and the length direction L2 and the X direction are the same direction.

A portion of the first external electrode 40A on the second main surface TS2 and a portion of the second external electrode 240A on the third main surface TS3 are opposed to each other via at least one of the exterior material 3 or the first bonding material 5A described later. A portion of the external electrode 40B on the second main surface TS2 and a portion of the second external electrode 240B on the third main surface TS3 are opposed to each other via at least one of the exterior material 3 or the first bonding material 5A described later.

The metal terminal 100 will be described with reference to FIGS. 1 to 6.

The metal terminal 100 includes a first metal terminal 100A and a second metal terminal 100B.

The first metal terminal 100A and the second metal terminal 100B are metal terminals to be mounted on a mounting surface of a mounting substrate or a mounting board (refer to the mounting substrate 810 in FIG. 13) to be described later on which the multilayer ceramic capacitor 1 is to be mounted. The first metal terminal 100A and the second metal terminal 100B are, for example, plate-shaped lead frames. In the present example embodiment of the present invention, the first main surface TS1 of the multilayer body 10 is a surface opposed to the mounting surface of the mounting substrate to which the multilayer ceramic capacitor 1 is to be mounted.

The first metal terminal 100A includes a first bonding portion 110A that is opposed to the first main surface TS1 and connected to the first external electrode 40A; a first rising portion 120A that is connected to the first bonding portion 110A, extends away from the mounting surface of the mounting substrate, and is opposed to the first end surface LS1, a first extension portion 130A that is connected to the first rising portion 120A and extends away from the first multilayer ceramic capacitor main body 2 in the length direction L, a first falling portion 140A that is connected to the first extension portion 130A and extends toward the mounting surface side of the mounting substrate, and a first mounting portion 150A that is connected to the first falling portion 140A and extends in the direction along the mounting surface of the mounting substrate. As shown in FIG. 6, a gap portion G exists between the first rising portion 120A and the first external electrode 40A.

The second metal terminal 100B includes a second bonding portion 110B that is opposed to the first main surface TS1 and connected to the first external electrode 40B, a second rising portion 120B that is connected to the second bonding portion 110B, extends away from the mounting surface of the mounting substrate, and is opposed to the fourth end surface LS4, a second extension portion 130B that is connected to the second rising portion 120B and extends away from the second multilayer ceramic capacitor main body 200 in the length direction L, a second falling portion 140B that is connected to the second extension portion 130B and extends toward the mounting surface side of the mounting substrate, and a second mounting portion 150B that is connected to the second falling portion 140B and extends in the direction along the mounting surface of the mounting substrate. As shown in FIG. 6, a gap portion G exists between the second rising portion 120B and the first external electrode 40B.

In addition, the first falling portion 140A and the second falling portion 140B preferably extend toward the mounting surface of the mounting substrate 810 such that a gap can be provided between the exterior material 3 of the multilayer ceramic capacitor 1 and the mounting surface of the mounting substrate 810.

By providing such a first metal terminal 100A and a second metal terminal 100B, it is possible to lengthen the distance between the mounting substrate 810 and the respective multilayer ceramic capacitor main bodies 2 and 200 such that it is possible to achieve an advantageous effect of relieving stress from the mounting substrate 810. Furthermore, the thickness of the exterior material 3 provided on the mounting substrate 810 side can be increased such that the insulating property can be ensured. The configurations of the first metal terminal 100A and the second metal terminal 100B are not limited thereto.

It is preferable that the first bonding portion 110A of the first metal terminal 100A and the second bonding portion 110B of the second metal terminal 100B are provided in the same or substantially the same plane in the exterior material 3.

The first metal terminal 100A and the second metal terminal 100B each include a terminal main body and a plating film provided on the surface of the terminal main body.

The terminal main body is preferably made of, for example, Ni, Fe, Cu, Ag, Cr, or an alloy including one or more metals selected from these metals as a main component. For example, the metal of the base material of the terminal main body may be an Fe-42Ni alloy, an Fe-18Cr alloy, or a Cu-8Sn alloy. Further, from the viewpoint of heat dissipation, the metal of the base material of the terminal main body may be, for example, an oxygen-free copper or a Cu-based alloy having high thermal conductivity. As described above, by making the material of the terminal main body a copper-based material having good thermal conductivity, it is possible to achieve a low ESR and low thermal resistance. Further, in the present example embodiment, the metal of the base material of the terminal main body may be made of, for example, stainless steel or aluminum having low wettability to solder. At least the surface of the metal of the base material of the terminal main body is a surface having lower wettability of solder than the plating film of the outermost surface. The thickness of the terminal main body is preferably, for example, about 0.05 mm or more and about 0.5 mm or less.

The plating film preferably includes an upper plating film provided on the outermost surface of the plating film and a lower plating film provided below the upper plating film. For example, the plating film may have a two-layer configuration in which an upper plating film is provided on the lower plating film. The lower plating film is preferably made of, for example, Ni, Fe, Cu, Ag, Cr, or an alloy including one or more metals selected from these metals as a main component. More preferably, the lower plating film is made of, for example, Ni, Fe, Cr, or an alloy including one or more metals among these metals as a main component. By providing the lower plating film with Ni, Fe, or Cr having a high melting point, or an alloy including one or more metals among these metals as a main component, the heat resistance of the metal terminal 100 can be improved. The thickness of the lower plating film is preferably, for example, about 0.2 µm or more and about 5.0 µm or less.

The upper plating film is preferably made of, for example, Sn, Ag, Au, or an alloy including one or more metals among these metals as a main component. More preferably, the upper plating film is made of, for example, Sn or an alloy including Sn as a main component. By providing the upper plating film with Sn or an alloy including Sn as a main component, the solderability between the first external electrode 40 and the metal terminal 100 can be improved. The thickness of the upper plating film is preferably, for example, about 1.0 µm or more and about 5.0 µm or less.

The upper plating film provided on the outermost surface of the plating film is a surface having a higher wettability of solder than the surface of the metal of the base material of the terminal main body. In addition, the upper plating film provided on the outermost surface of the plating film is a surface having a higher wettability of solder than the surface of the lower plating film. For example, the lower plating film is preferably a Ni-plated film. The upper plating film is preferably, for example, a Sn-plated film.

In addition, the first metal terminal 100A and the second metal terminal 100B may each include an exposed surface in which a material inside the plating film on the outermost surface of the plating film is exposed in a portion of the surface. By providing an exposed surface on a portion of the surface, solder is less likely to be attached to the exposed surface, such that it is possible to reduce or prevent the occurrence of a problem such as solder splash, for example.

Here, the exposed surface may be a surface on which the lower plating film is exposed. The solder wettability of the lower plating film is lower than that of the upper plating film. The exposed surface may be a surface on which the base material of the terminal main body is exposed. The surface of the base material of the terminal main body is lower in wettability of solder than the upper plating film.

The exposed surface may be provided by forming a plating film on the terminal main body, and then performing a removal process. The removal process may be, for example, a mechanical removal process by grinding or polishing, a removal process by laser trimming, or a removal process by a plating release agent such as sodium hydroxide. Before the plating film is formed, a portion to be formed as an exposed surface may be covered with a resist. In this case, the exposed surface is formed by removing the resist after the plating film is formed.

The bonding material 5 will be described with reference to FIG. 6.

As shown in FIG. 6, the bonding material 5 includes a first bonding material 5A, a second bonding material 5B, and a third bonding material 5C.

The first bonding materials 5A bond the respective multilayer ceramic capacitor main bodies 2 and 200. The first external electrode 40A and the second external electrode 240A are bonded to each other via the first bonding material 5A. The first external electrode 40B and the second external electrode 240B are bonded to each other via the first bonding material 5A. With such a configuration, an assembly of the multilayer ceramic capacitor main bodies (hereinafter referred to as "capacitor assembly G") formed by the multilayer ceramic capacitor main bodies 2 and 200 arranged in the lamination direction T1 and T2 is provided.

The second bonding material 5B bonds the first external electrode 40A and the first metal terminal 100A. The first external electrode 40A and the first bonding portion 110A are bonded to each other via the second bonding material 5B.

The third bonding material 5C bonds the first external electrode 40B and the second metal terminal 100B. The first external electrode 40B and the second bonding portion 110B are bonded to each other via the third bonding material 5C.

The bonding material 5 is bonded to the exterior material 3 described later.

Figure 14:
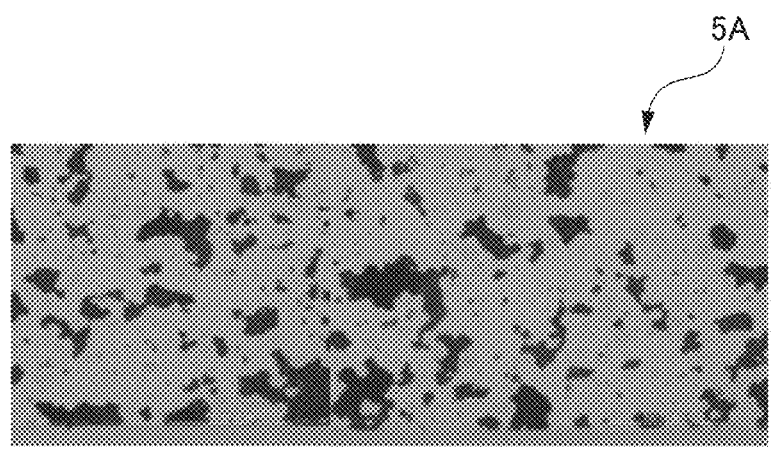
FIG. 14 is an enlarged view of the surface of the first bonding material, showing a case where the porosity is about 20%.
Figure 15:
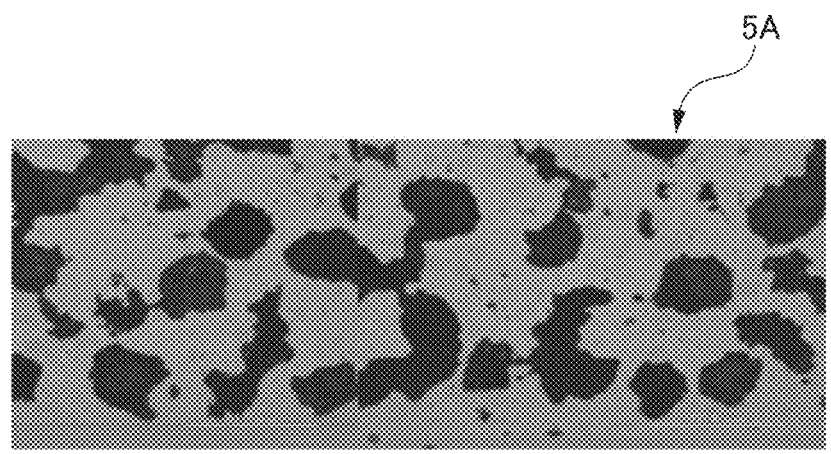
FIG. 15 is an enlarged view of the surface of the first bonding material, showing a case where the porosity is about 50%.

As shown in FIGS. 14 and 15, each of the bonding materials 5 includes voids. With such a configuration, since irregularities are provided on the surface of the bonding material 5, adhesion between the bonding material 5 and the exterior material 3 can be improved. Further, with the bonding material 5A, it is possible to preferably relieve stresses on the respective capacitor multilayer bodies 10 and 210. FIG. 14 is a view showing the surface of the first bonding material 5A having a porosity of about 20%, and FIG. 15 is a view showing the surface of the first bonding material 5A having a porosity of, for example, about 50%.

The first bonding material 5A is preferably, for example, a TLPS material used for bonding by a transition liquid phase sintering method (TLPS). With such a configuration, it is possible to reduce the possibility that the first bonding material 5A deteriorates due to the influence of heat when the metal terminal 100 is bonded to the first multilayer ceramic capacitor main body 2 and the influence of heat when the multilayer ceramic capacitor 1 is mounted on the mounting substrate 810.

TLPS materials include high melting point materials and low melting point materials. The high melting point materials include, for example, at least one metal selected from the group including copper, silver, aluminum, gold, platinum, palladium, beryllium, rhodium, nickel, cobalt, iron, and molybdenum. The low melting point materials include, for example, at least one metal selected from the group including tin, antimony, bismuth, cadmium, zinc, gallium, indium, tellurium, mercury, thallium, selenium, and polonium.

The first bonding material 5A may be, for example, solder or an electrically conductive adhesive. When the first bonding material 5A is solder, a high melting point solder is preferable. With such a configuration, it is possible to reduce the possibility that the first bonding material 5A is remelted due to heat or the like at the time of mounting the multilayer ceramic capacitor 1.

The second bonding material 5B and the third bonding material 5C can be made of the same material as the first bonding material 5A. For example, the first bonding material 5A may be a TLPS material, and the second bonding material 5B and the third bonding material 5C may be a TLPS material. In this case, it is possible to reduce the possibility of deterioration of the second bonding material 5B and the third bonding material 5C due to the influence of heat when the multilayer ceramic capacitor 1 is mounted on the mounting substrate 810. Further, the porosity of the second bonding material 5B and the third bonding material 5C can be adjusted more easily.

The second bonding material 5B and the third bonding material 5C may be, for example, solder. In this case, it is possible to reduce the manufacturing cost while ensuring the bonding strength. In addition, it is possible to reduce the possibility of deterioration of the first bonding material 5A bonded in the preceding process.

The second bonding material 5B and the third bonding material 5C may be electrically conductive adhesives. The first bonding material 5A, the second bonding material 5B, and the third bonding material 5C may be made of different materials. Further, when the second bonding material 5B and the third bonding material 5C are made of solder, when the porosity of the first bonding material 5A is made higher than the porosity of the second bonding material 5B and the third bonding material 5C, the adjustment becomes easy.

The exterior material 3 will be described with reference to FIGS. 1 to 6.

The exterior material 3 includes a first main surface MTS1 and a second main surface MTS2 which are opposed to each other in the lamination direction T1 (lamination direction T2), a first lateral surface MWS1 and a second lateral surface MWS2 which are opposed to each other in the width direction W1 (width direction W2), and a first end surface MLS1 and a second end surface MLS2 which are opposed to each other in the length direction L1 (length direction L2). The first end surface MLS1 of the exterior material 3 is a surface of the exterior material 3, and a surface on the side of the first end surface LS1 of the capacitor multilayer body 10 and the third end surface LS3 of the capacitor multilayer body 210. The second end surface MLS2 of the exterior material 3 is a surface of the exterior material 3, and a surface on the side of the second end surface LS2 of the capacitor multilayer body 10 and the fourth end surface LS4 of the capacitor multilayer body 210.

The exterior material 3 covers the entire or substantially the entire first multilayer ceramic capacitor main body 2, the entire or substantially the entire second multilayer ceramic capacitor main body 200, a portion of the first metal terminal 100A, a portion of the second metal terminal 100B, and the entire bonding material 5.

For example, the exterior material 3 covers the entire or substantially the entire first bonding portion 110A, the entire or substantially the entire first rising portion 120A, and at least a portion of the first extension portion 130A of the first metal terminal 100A. Furthermore, the exterior material 3 covers the entire or substantially the entire second bonding portion 110B, the entire or substantially the entire second rising portion 120B, and at least a portion of the second extension portion 130B of the second metal terminal 100B.

In the present example embodiment of the present invention, the first extension portion 130A of the first metal terminal 100A protrudes from the first end surface MLS1 of the exterior material 3 and is partially exposed. The second extension portion 130B of the second metal terminal 100B protrudes from the second end surface MLS2 of the exterior material 3 and is partially exposed. More specifically, the first extension portion 130A of the first metal terminal 100A protrudes substantially at the middle portion of the first end surface MLS1 of the exterior material 3 as viewed in the lamination direction T and is partially exposed. The second extension portion 130B of the second metal terminal 100B protrudes substantially at the middle portion of the second end surface MLS2 of the exterior material 3 as viewed in the lamination direction T and is partially exposed.

The second main surface MTS2 of the exterior material 3 preferably has a planar shape with a predetermined flatness. With such a configuration, it is possible to prevent improper suction adhesion of the mounter of the mounting machine used when mounting the multilayer ceramic capacitor 1 on the mounting substrate. Therefore, it is possible to reliably mount the multilayer ceramic capacitor 1 on the mounting substrate. As a result, it is possible to reduce or prevent the occurrence of mounting defects.

The minimum distance from the second main surface MTS2 of the exterior material 3 to the surface of the second multilayer ceramic capacitor main body 200 is preferably, for example, about 100 μm or more and about 4000 μm or less. The minimum distance from the first main surface MTS1 of the exterior material 3 to the first bonding portion 110A of the first metal terminal 100A is preferably, for example, about 100 μm or more and about 4000 μm or less.

The minimum distances from the first lateral surface MWS1 of the exterior material 3 to the respective surfaces of the multilayer ceramic capacitor main bodies 2 and 200 are preferably, for example, about 100 μm or more and about 4000 μm or less. The minimum distances from the second lateral surface MWS2 of the exterior material 3 to the respective surfaces of the multilayer ceramic capacitor main bodies 2 and 200 are preferably, for example, about 100 μm or more and about 4000 μm or less.

The minimum distances from the first end surface MLS1 of the exterior material 3 to the respective surfaces of the multilayer ceramic capacitor main bodies 2 and 200 are preferably, for example, about 300 μm or more and about 5000 μm or less. The minimum distances from the second end surface MLS2 of the exterior material 3 to the respective surfaces of the multilayer ceramic capacitor main bodies 2 and 200 are preferably, for example, about 300 μm or more and about 5000 μm or less.

The average distance in the length direction L1 (length direction L2) from the first main surface-side surface MLS1A of the first end surface MLS1 of the exterior material 3 to the first rising portion 120A of the first metal terminal 100A is preferably, for example, about 200 μm or more and about 4900 μm or less. The average distance in the length direction L1 (length direction L2) from the first main surface-side surface MLS2A of the second end surface MLS2 of the exterior material 3 to the second rising portion 120B of the second metal terminal 100B is preferably, for example, about 200 μm or more and about 4900 μm or less.

The exterior material 3 is preferably, for example, made of a resin. For example, the exterior material 3 may be formed by, for example, molding engineering plastic by transfer molding, injection molding, or the like. In particular, the material of the exterior material 3 preferably includes, for example, a thermosetting epoxy resin. With such a configuration, adhesion between the exterior material 3, and the first multilayer ceramic capacitor main body 2 and the metal terminal 100 can be ensured, such that it is possible to achieve the advantageous effect of improving the withstand voltage and moisture resistance. The exterior material 3 may be formed, for example, by applying a liquid or powdery silicone-based or epoxy-based resin.

In this way, by the exterior material 3 covering the conductive metal portion such as the first external electrode 40, the second external electrode 240, and the metal terminal 100 over a wide range, it is possible to ensure the insulating surface distance (creeping distance) between the conductors. Furthermore, by covering the conductive metal portion over a wide range with the exterior material 3, it is possible to avoid the risk of surface discharge.

The exterior material 3 includes voids. The porosity of the exterior material 3 is preferably, for example, about 10% or less, more preferably about 5% or less, and still more preferably about 3% or less. With such a configuration, it is possible to reduce or prevent permeation of steam from the outside.

The shape of the exterior material 3 is not particularly limited. For example, a truncated cone such as a truncated pyramid may be used. The shape of the corner portion of the exterior material 3 is not particularly limited, and may be rounded.

The relationship between the porosity of the bonding material 5 and the porosity of the exterior material 3 will now be described.

The porosity of the first bonding material 5A is higher than the porosity of the exterior material 3. With such a configuration, the exterior material 3 can sufficiently bite into the irregularities on the surface of the first bonding material 5A, and the adhesiveness between the first bonding material 5A and the exterior material 3 can be improved. This makes it possible to reduce or prevent the occurrence of peeling or separation between the first bonding material 5A and the exterior material 3 while reducing the permeation of steam from the outside by the exterior material. Further, it is possible to absorb the stress applied to the respective capacitor multilayer bodies 10 and 210 from the outside.

The porosity of the first bonding material 5A is preferably, for example, about 20% or more and about 50% or less. With such a configuration, it is possible to reduce or prevent the occurrence of peeling between the first bonding material 5A and the exterior material 3 more appropriately while reducing the permeation of steam from the outside. Further, it is possible to suitably absorb the stress applied to the respective capacitor multilayer bodies 10 and 210 from the outside.

Even when the porosity of the first bonding material 5A is less than about 20%, by making the porosity of the exterior material 3 relatively lower than the porosity of the first bonding material 5A, it is possible to improve the adhesiveness between the first bonding material 5A and the exterior material 3.

When the porosity of the first bonding material 5A is more than about 50%, the irregularities of the surface of the first bonding material 5A become large, which is advantageous for the effect of reducing or preventing the occurrence of peeling between the first bonding material 5A and the exterior material 3. Further, it is also advantageous for the effect of more suitably absorbing the stress applied to the capacitor multilayer bodies 10 and 210 from the outside. However, since the first bonding material 5A is not dense, the strength of the first bonding material 5A itself may be reduced. However, it is possible to reduce the possibility that the first bonding material 5A is damaged by the exterior material 3.

The porosity of the second bonding material 5B and the third bonding material 5C may be higher than the porosity of the exterior material 3. By making the porosity of the exterior material 3 relatively lower than the porosity of the second bonding material 5B and the third bonding material 5C, the exterior material 3 can sufficiently bite into the irregularities on the surfaces of the second bonding material 5B and the third bonding material 5C, such that it is possible to improve the adhesiveness between the second bonding material 5B and the third bonding material 5C and the exterior material 3. With such a configuration, it is possible to reduce or prevent the occurrence of peeling between the second bonding material 5B and the third bonding material 5C and the exterior material 3 while reducing the permeation of steam from the outside. Further, it is possible to absorb the stress applied to the capacitor multilayer bodies 10 and 210 from the outside.

The porosity of each of the second bonding material 5B and the third bonding material 5C may be, for example, about 20% or more and about 50% or less. The porosity of the second bonding material 5B and the third bonding material 5C may be the same or substantially the same as the porosity of the first bonding material 5A. The material of the second bonding material 5B and the material of the third bonding material 5C may be the same or substantially the same as the material of the first bonding material 5A.

The porosity of the first bonding material 5A may be higher than that of the second bonding material 5B and the third bonding material 5C. For example, the porosity of the first bonding material 5A may be about 20% or more and about 50% or less, and the porosity of each of the second bonding material 5B and the third bonding material 5C may be less than about 20%. In this case, the bonding property between the external electrode 40 of the first multilayer ceramic capacitor main body 2 and the metal terminal 100 is sufficiently ensured, and it is possible to reduce or prevent the occurrence of peeling between the first bonding material 5A and the exterior material 3. Further, it is possible to absorb the stress applied to the capacitor multilayer bodies 10 and 210 from the outside.

Next, a non-limiting example of a method of manufacturing the multilayer ceramic capacitor 1 of the present example embodiment will be described. First, a method of manufacturing the respective multilayer ceramic capacitor main bodies 2 and 200 will be described. Since the manufacturing method of each of the multilayer ceramic capacitor main bodies 2 and 200 is the same or substantially the same, the first multilayer ceramic capacitor main body 2 will be described as an example.

A dielectric sheet for the dielectric layer 20 and a conductive paste for the internal electrode layer 30 are provided. The conductive paste for the internal electrode and the dielectric sheet includes a binder and a solvent. Known binders and solvents may be used.

The conductive paste for the internal electrode layer 30 is printed on the dielectric sheet in a predetermined pattern by, for example, screen printing or gravure printing. Thus, the dielectric sheet in which the pattern of the first internal electrode layer 31 is formed, and the dielectric sheet in which the pattern of the second internal electrode layer 32 is formed are provided.

A predetermined number of dielectric sheets in which the pattern of the internal electrode layer is not printed are laminated (stacked), such that a portion functioning as the first main surface-side outer layer portion 12 close to the first main surface TS1 is formed. The dielectric sheet in which the pattern of the first internal electrode layer 31 is printed and the dielectric sheet in which the pattern of the second internal electrode layer 32 is printed are sequentially laminated thereon, such that a portion defining and functioning as the inner layer portion 11 is formed. A predetermined number of the dielectric sheets in which the pattern of the internal electrode layer is not printed are laminated on the portion functioning as the inner layer portion 11, such that a portion defining and functioning as the second main surface-side outer layer portion 13 close to the second main surface TS2 is formed. Thus, a laminated sheet is manufactured.

The laminated sheets are pressed in the lamination direction by hydrostatic pressing, for example, such that a laminated block is manufactured.

The laminated block is cut to a predetermined size, such that a laminated (multilayer) chip is cut out. At this time, corner portions and ridge portions of the multilayer chip may be rounded by barrel polishing or the like.

The multilayer chip is fired to manufacture the capacitor multilayer body 10. The firing temperature depends on the materials of the dielectric layer 20 and the internal electrode layer 30. However, the firing temperature is preferably, for example, about 900° C. or more and about 1400° C. or less.

The conductive paste defining and functioning as the first base electrode layer 50A and the second base electrode layer 50B is applied to both end surfaces of the capacitor multilayer body 10. In an example embodiment of the present invention, the first base electrode layer 50A and the second base electrode layer 50B are fired layers. For example, a conductive paste including a glass component and metal is applied to the capacitor multilayer body 10 by, for example, a method such as dipping. Thereafter, a firing process is performed to form the first base electrode layer 50A and the second base electrode layer 50B. The temperature of the firing process at this time is preferably, for example, about 700° C. or higher and about 900° C. or lower.

In a case in which the multilayer chip before firing and the conductive paste applied to the multilayer chip are fired simultaneously, it is preferable that the fired layer is formed by firing a ceramic material added instead of a glass component. At this time, it is particularly preferable to use the same type of ceramic material as the dielectric layer 20 as the ceramic material to be added. In this case, the conductive paste is applied to the multilayer chip before firing, and the multilayer chip and the conductive paste applied to the multilayer chip are fired simultaneously to form the capacitor multilayer body 10 including the fired layer formed therein.

When a thin film layer is formed as the first base electrode layer 50A and the second base electrode layer 50B, a thin film layer may be formed on a portion of the first main surface TS1 and a portion of the second main surface TS2 of the capacitor multilayer body 10. The thin film layer may be, for example, a sputtering electrode by a sputtering method. In a case in which the sputtering electrode is formed on a portion of the first main surface TS1 and a portion of the second main surface TS2 of the capacitor multilayer body 10 as the first base electrode layer 50A and the second base electrode layer 50B, for example, a fired layer is formed on the first end surface LS1 and on the second end surface LS2. Alternatively, a plated layer, which will be described later, may be formed directly on the capacitor multilayer body 10 without forming the base electrode layer on the first end surface LS1 and the second end surface LS2.

Thereafter, the first plated layer 60A is formed on the first base electrode layer 50A. Furthermore, the second plated layer 60B is formed on the second base electrode layer 50B. In an example embodiment of the present invention, the Ni-plated layer and the Sn-plated layer are formed as the plated layers. The Ni-plated layer and the Sn-plated layer are sequentially formed, for example, by a barrel plating method.

By such a manufacturing process, the first multilayer ceramic capacitor main body 2 is manufactured.

Next, a non-limiting example of a method of manufacturing the first metal terminal 100A and the second metal terminal 100B will be described.

A plating film is applied to the terminal main body defining the first metal terminal 100A and the second metal terminal 100B. Then, at least the film of the outermost surface of the plating film is peeled off, such that an exposed surface is formed on which the surface with low wettability of the solder is exposed. Alternatively, the terminal main body in a state in which a portion of the surface is masked with a resist or the like may be subjected to a plating treatment, such that an exposed surface is formed on which the surface with low wettability of the solder is exposed.

Next, a process of bonding the multilayer ceramic capacitor main bodies 2 and 200 to each other will be described.

The respective multilayer ceramic capacitor main bodies 2 and 200 are bonded to each other by the first bonding material 5A.

The second multilayer ceramic capacitor main body 200 is provided on the second main surface TS2 side of the first multilayer ceramic capacitor main body 2. At this time, the first bonding material 5A is provided between the first external electrode 40A and the second external electrode 240A, and is also provided between the first external electrode 40B and the second external electrode 240B. After that, by performing predetermined processing, the first external electrode 40A and the second external electrode 240A can be bonded to each other by the first bonding material 5A, and the first external electrode 40B and the second external electrode 240B can be bonded to each other by the first bonding material 5A.

Next, a process of bonding the first multilayer ceramic capacitor main body 2 to the first metal terminal 100A and the second metal terminal 100B will be described.

The first external electrode 40A and the first metal terminal 100A are bonded to each other by the second bonding material 5B. The first external electrode 40B and the second metal terminal 100B are bonded to each other by the third bonding material 5C.

A portion of the first external electrode 40A on the first main surface TS1 is opposed to the first bonding portion 110A of the first metal terminal 100A. At this time, the second bonding material 5B is provided between the first external electrode 40A and the first metal terminal 100A (the first bonding portion 110A). Then, by performing predetermined processing, the first external electrode 40A and the first metal terminal 100A can be bonded to each other by the second bonding material 5B.

A portion of the first external electrode 40B on the first main surface TS1 is opposed to the second bonding portion 110B of the second metal terminal 100B. At this time, the third bonding material 5C is provided between the first external electrode 40B and the second metal terminal 100B (the second bonding portion 110B). Then, by performing predetermined processing, the first external electrode 40B and the second metal terminal 100B can be bonded to each other by the third bonding material 5C.

The first bonding material 5A, the second bonding material 5B, and the third bonding material 5C are, for example, TPLS materials. The TPLS material includes a high melting point metal and a low melting point metal. In a case of bonding with TLPS, by heating and holding at a temperature higher than the melting point of the selected low melting point metal for a certain period of time, solid solution diffusion is performed with the high melting point metal to obtain a bonded body having a high melting point.

The first bonding material 5A, the second bonding material 5B, and the third bonding material 5C may be made of, for example, solder. During reflow of the solder, for example, the solder is heated at a temperature of about 270° C. or higher and about 290° C. or lower for about 30 seconds or longer.

Next, a process of covering each of the multilayer ceramic capacitor main bodies 2 and 200, the bonding material 5, a portion of the first metal terminal 100A, and a portion of the second metal terminal 100B with the exterior material 3 will be described.

The exterior material 3 is formed by, for example, a transfer molding method. Specifically, the multilayer ceramic capacitor before being covered with the exterior material 3, that is, the first multilayer ceramic capacitor main body 2 to which the second multilayer ceramic capacitor main body 200 is bonded via the first bonding material 5A and to which the metal terminal 100 is bonded via the second bonding material 5B and the third bonding material 5C is provided in a mold, and then a resin of the exterior material 3 is filled in the mold, and the resin is cured. Thus, the exterior material 3 is provided so as to cover each of the multilayer ceramic capacitor main bodies 2 and 200, the bonding material 5, a portion of the first metal terminal 100A, and a portion of the second metal terminal 100B. At this time, the gap portion G can also be filled with the exterior material 3. The first bonding material 5A, the second bonding material 5B, the third bonding material 5C, and the exterior material 3 are bonded to each other.

Finally, when there is an unnecessary portion in the metal terminal 100, the unnecessary portion is cut using a stamping die or the like. Then, the metal terminal 100 is bent into a desired shape using a bending die or the like. Thus, the metal terminal 100 may be formed by bending. That is, each connection portion of the metal terminal 100 formed by bending may be formed by bending. The bending process may be partially performed before molding the exterior material 3.

By the above-described example of a manufacturing method, the multilayer ceramic capacitor 1 of the present example embodiment is manufactured.

Figure 13:
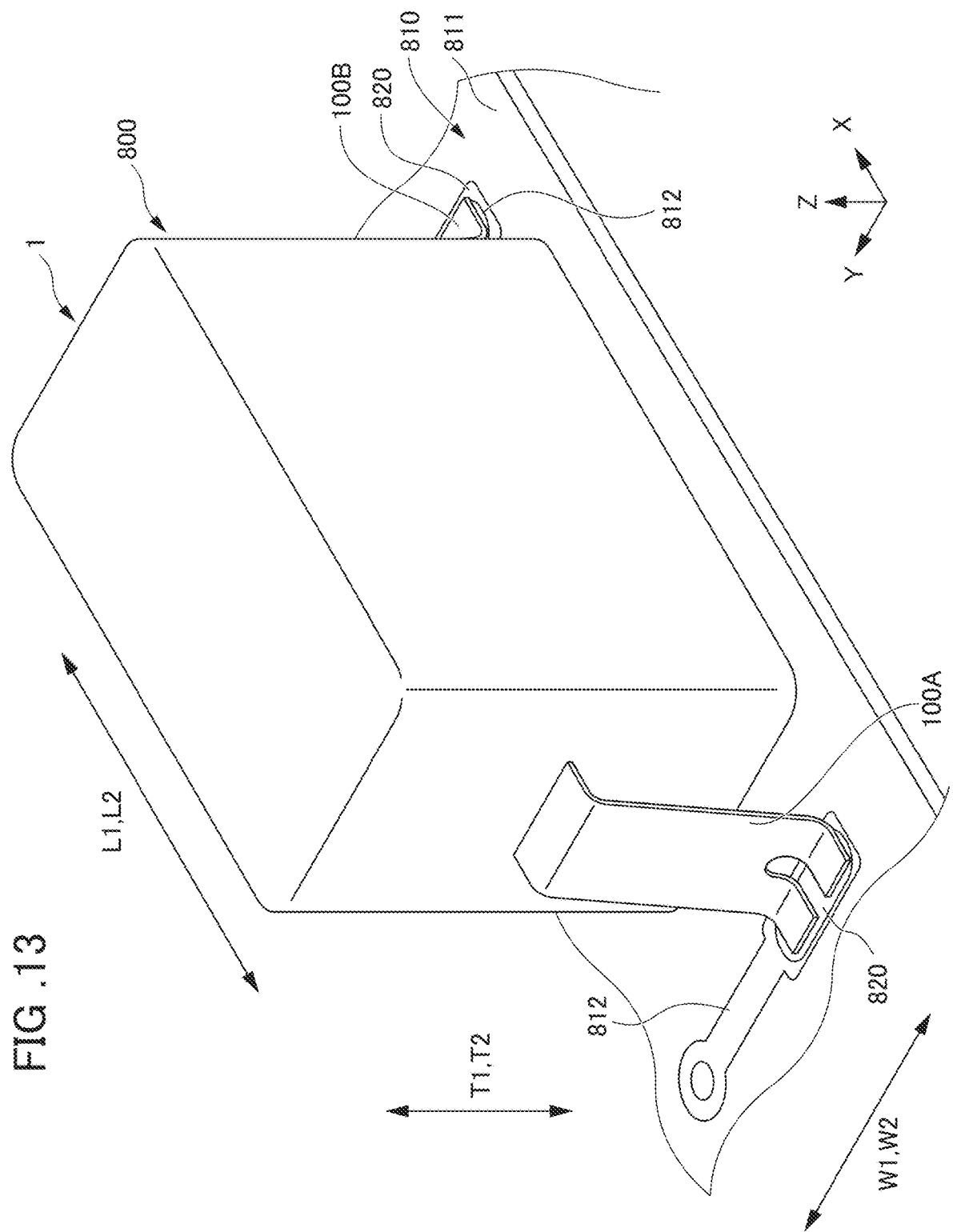
FIG. 13 is an external perspective view showing a mounting configuration in which a multilayer ceramic capacitor according to an example embodiment of the present invention is mounted on a mounting substrate.

FIG. 13 shows a mounting configuration 800 of the multilayer ceramic capacitor 1. FIG. 13 is an external perspective view of a mounting configuration 800 in which the multilayer ceramic capacitor 1 of the present example embodiment is mounted on a mounting substrate 810.

The multilayer ceramic capacitor 1 which is covered with the exterior material 3 and completed as a final product is then reflow-mounted on the mounting substrate 810 as a component via the substrate mounting bonding material 820.

Specifically, the first metal terminal 100A and the second metal terminal 100B are bonded to the wiring member 812 provided on the mounting surface 811 of the mounting substrate 810 via the substrate mounting bonding material 820. The second metal terminal 100B is bonded to the wiring member 812 provided on the mounting surface 811 of the mounting substrate 810 via the substrate mounting bonding material 820.

Figure 16:
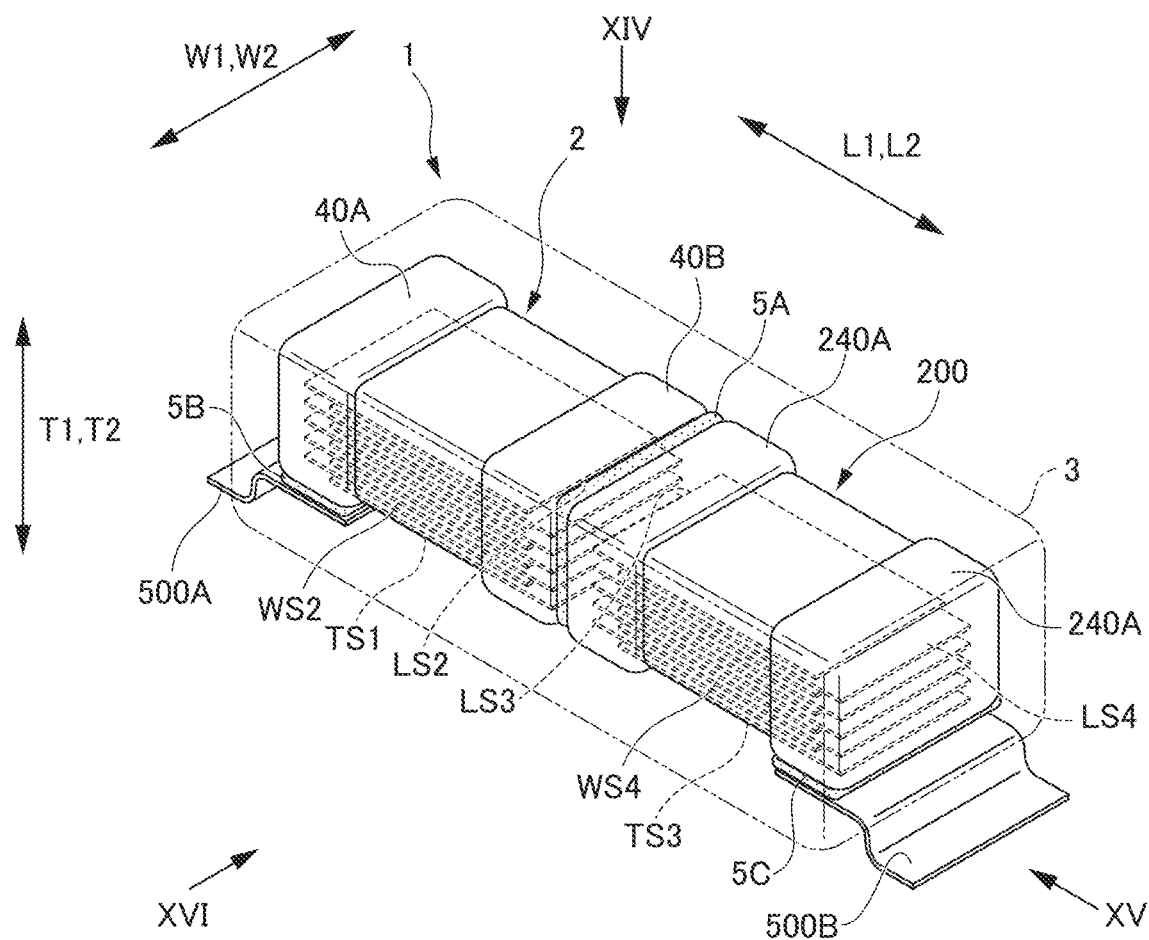
FIG. 16 is a virtual perspective view showing a first modification of a multilayer ceramic capacitor according to an example embodiment.
Figure 17:
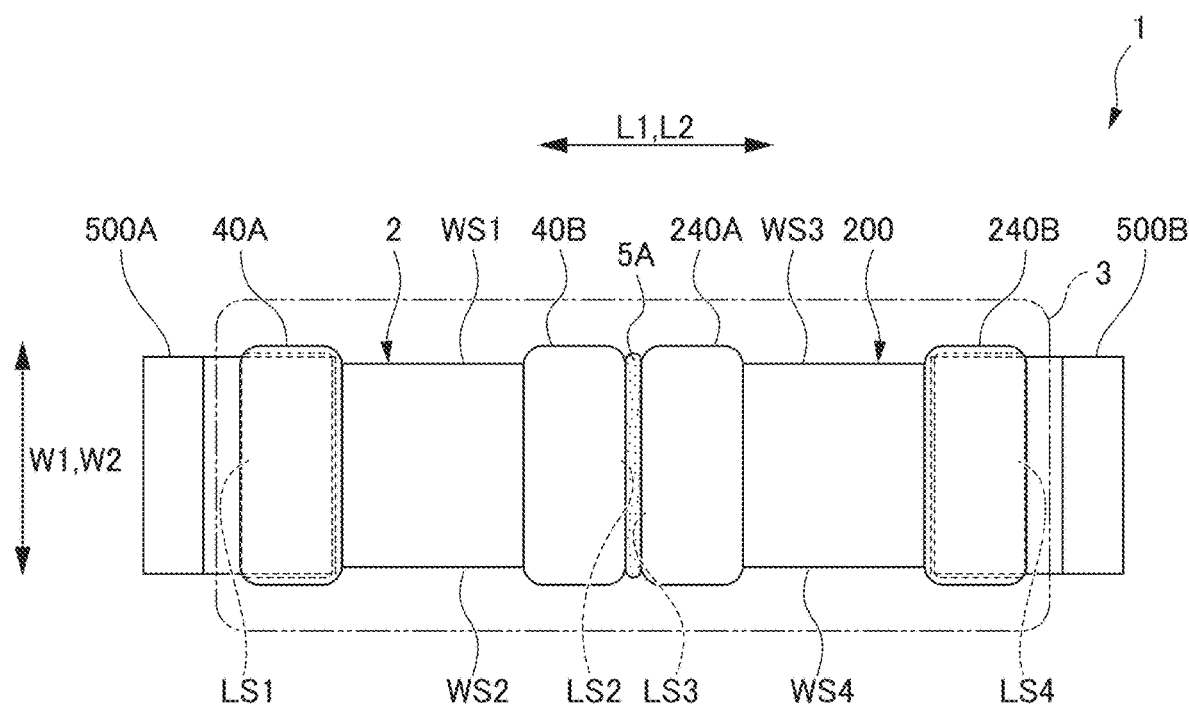
FIG. 17 is a virtual arrow view when the multilayer ceramic capacitor of FIG. 16 is viewed in the direction of the arrow XIV.
Figure 18:
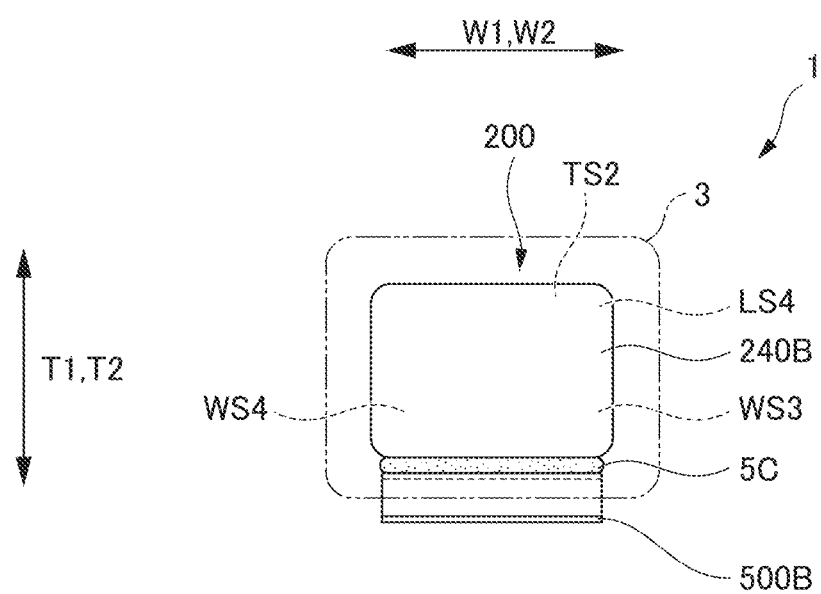
FIG. 18 is a virtual arrow view when the multilayer ceramic capacitor of FIG. 16 is viewed in the direction of the arrow XV.
Figure 19:
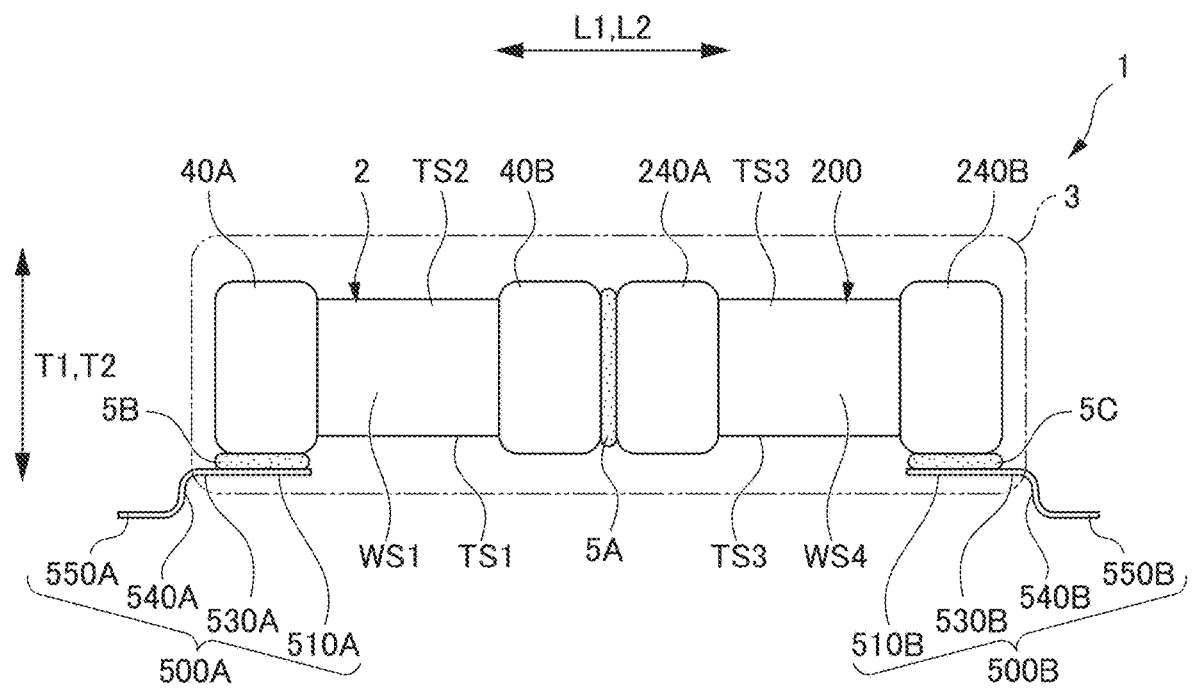
FIG. 19 is a virtual arrow view when the multilayer ceramic capacitor of FIG. 16 is viewed in the direction of the arrow XVI.

Hereinafter, a first modification of the multilayer ceramic capacitor 1 of the above example embodiment will be described with reference to FIGS. 16 to 19. In the following description, the same or corresponding components as those in the above example embodiment are denoted by the same reference numerals, and a detailed description thereof is omitted. FIG. 16 is a virtual perspective view of a first modification of the multilayer ceramic capacitor 1 of the present example embodiment. FIG. 17 is a virtual view of the multilayer ceramic capacitor 1 of FIG. 16 as viewed in the direction of the arrow XIV. FIG. 18 is a virtual view of the multilayer ceramic capacitor 1 of FIG. 16 as viewed in the direction of the arrow XV. FIG. 19 is a virtual arrow view of the multilayer ceramic capacitor 1 of FIG. 16 as viewed in the direction of the arrow XVI.

In the present modification, the arrangement of the multilayer ceramic capacitor main bodies 2 and 200 is different from that in the above example embodiment. The second multilayer ceramic capacitor main body 200 is provided on the second end surface LS2 side of the first multilayer ceramic capacitor main body 2. A portion of the first external electrode 40B of the first multilayer ceramic capacitor main body 2 on the second end surface LS2 and a portion of the second external electrode 240A of the second multilayer ceramic capacitor main body 200 on the third end surface LS3 are opposed to each other. At least one of the first bonding material 5A or the exterior material 3 is provided between the first external electrode 40B and the second external electrode 240A. The first external electrode 40B and the second external electrode 240A are bonded to each other by the first bonding material 5A.

Further, in the present modification, the configurations of the first metal terminal and the second metal terminal are different from those in the above example embodiment. The multilayer ceramic capacitor 1 of the present modification includes a first metal terminal 500A and a second metal terminal 500B.

The first metal terminal 500A includes a first bonding portion 510A opposed to the first main surface TS1 and connected to the first external electrode 40A, a first extension portion 530A extending in the length directions L1 and L2 away from the first multilayer ceramic capacitor main body 2, a first falling portion 540A connected to the first extension portion 530A and extending toward the mounting surface side of the mounting substrate, and a first mounting portion 550A connected to the first falling portion 540A and extending along the mounting surface of the mounting substrate.

The first bonding portion 510A of the first metal terminal 500A is bonded to a portion of the first external electrode 40A of the first multilayer ceramic capacitor main body 2 on the first main surface TS1. At least one of the second bonding material 5B or the exterior material 3 is provided between the first bonding portion 510A and the first external electrode 40A. The first metal terminal 500A and the first external electrode 40A are bonded to each other by the second bonding material 5B.

The second metal terminal 500B includes a second bonding portion 510B opposed to the third main surface TS3 and connected to the second external electrode 240B, a second extension portion 530B that extends in the length directions L1 and L2 away from the second multilayer ceramic capacitor main body 200, a second falling portion 540B that is connected to the second extension portion 530B and extends toward the mounting surface side of the mounting substrate, and a second mounting portion 550B that is connected to the second falling portion 540B and extends along the mounting surface of the mounting substrate.

The second bonding portion 510B of the second metal terminal 500B is bonded to a portion of the second external electrode 440B of the second multilayer ceramic capacitor main body 200 on the third main surface TS3. At least one of the second bonding material 5B or the exterior material 3 is provided between the second bonding portion 510B and the second external electrode 240B. The second metal terminal 500B and the second external electrode 240B are bonded to each other by the second bonding material 5B.

As described above, the multilayer ceramic capacitor main bodies 2 and 200 may be connected in series. With such a configuration, it is possible to improve the capacitance of the multilayer ceramic capacitor 1.

Figure 20:
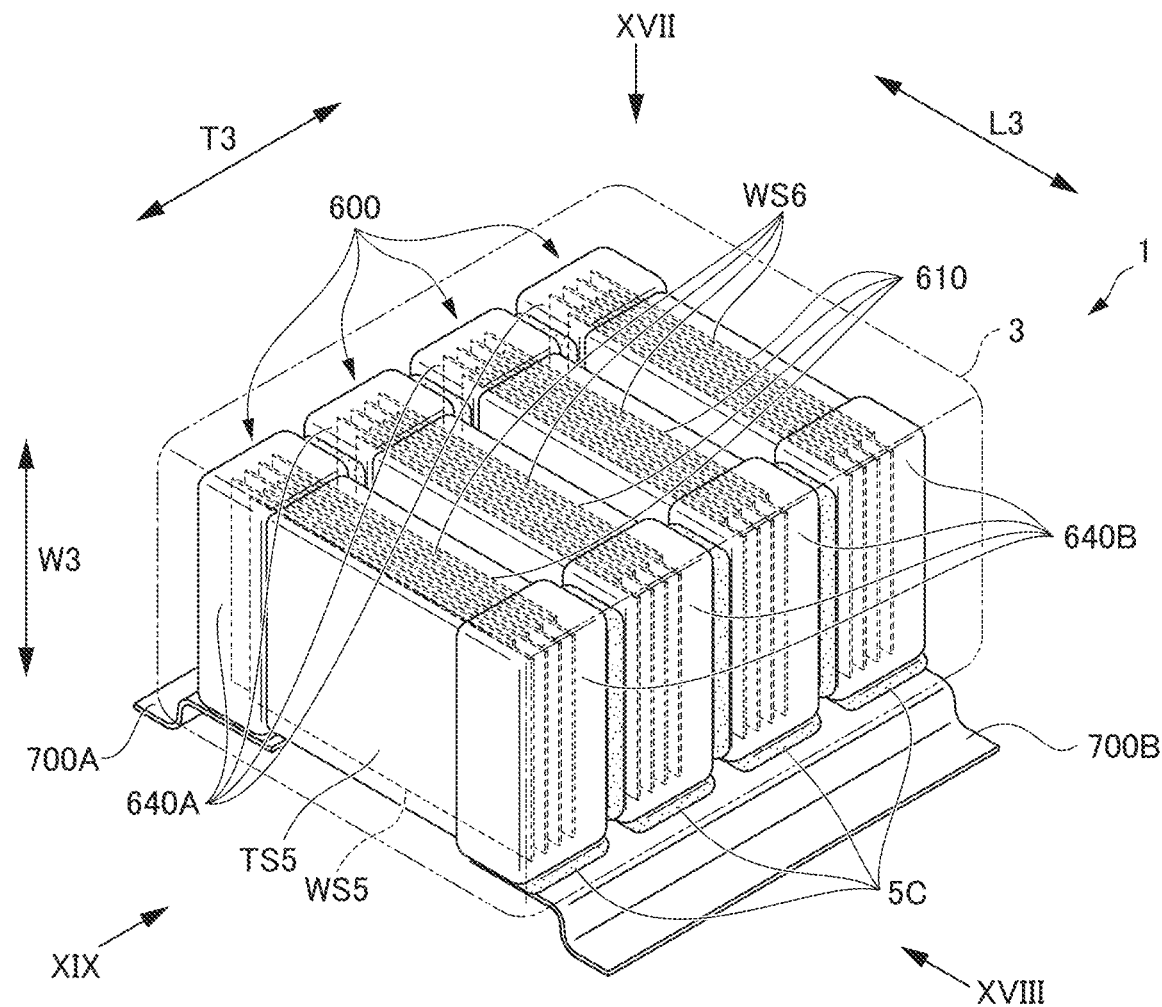
FIG. 20 is a virtual perspective view of a second modification of a multilayer ceramic capacitor according to an example embodiment of the present invention.
Figure 21:
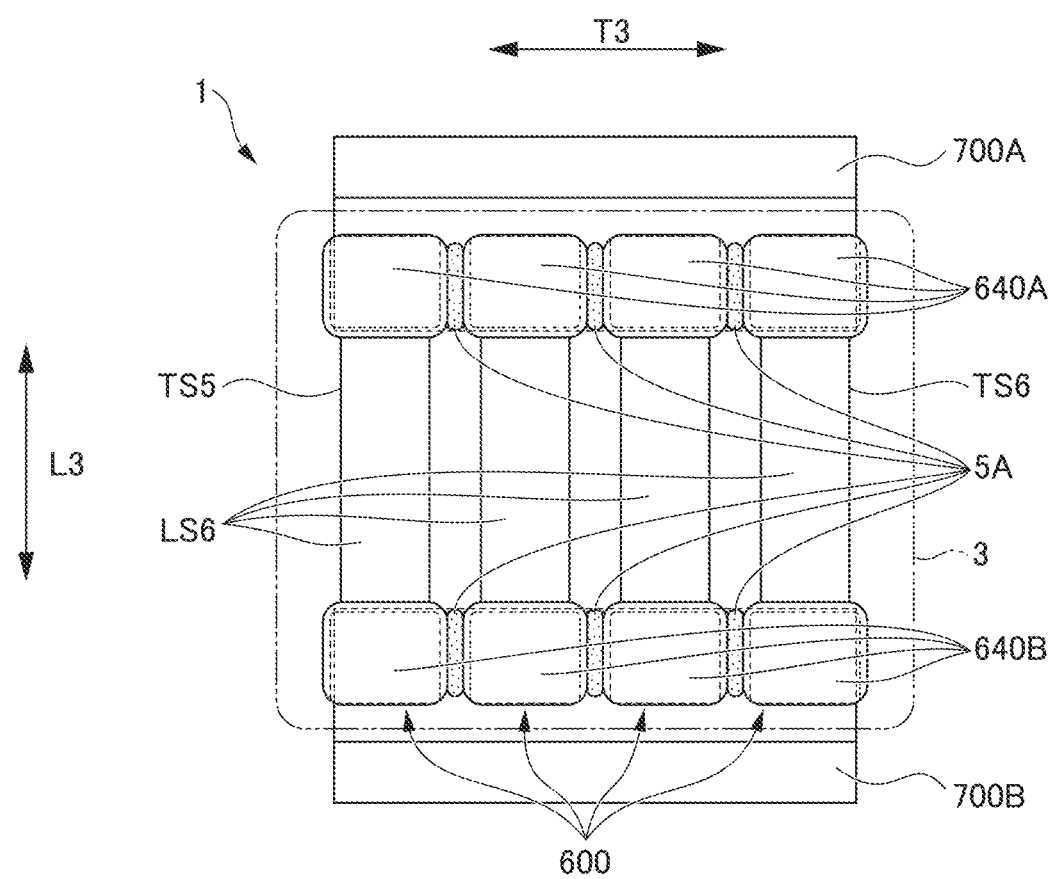
FIG. 21 is a virtual arrow view when the multilayer ceramic capacitor of FIG. 20 is viewed in the direction of the arrow XVII.
Figure 22:
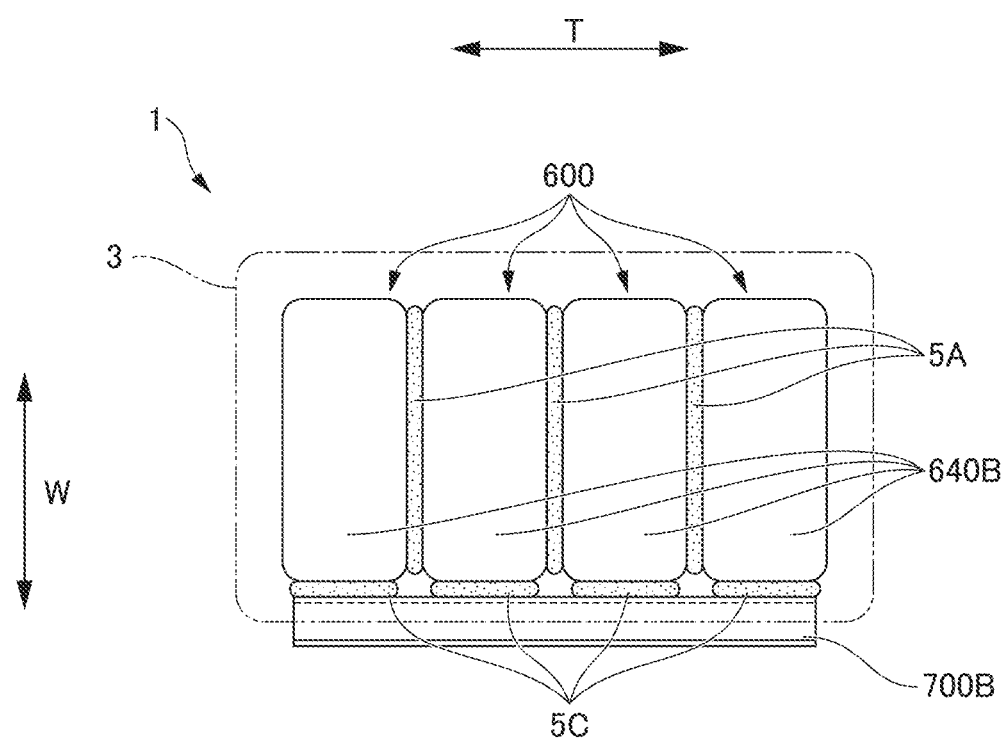
FIG. 22 is a virtual arrow view when the multilayer ceramic capacitor of FIG. 20 is viewed from the direction of the arrow XVIII.
Figure 23:
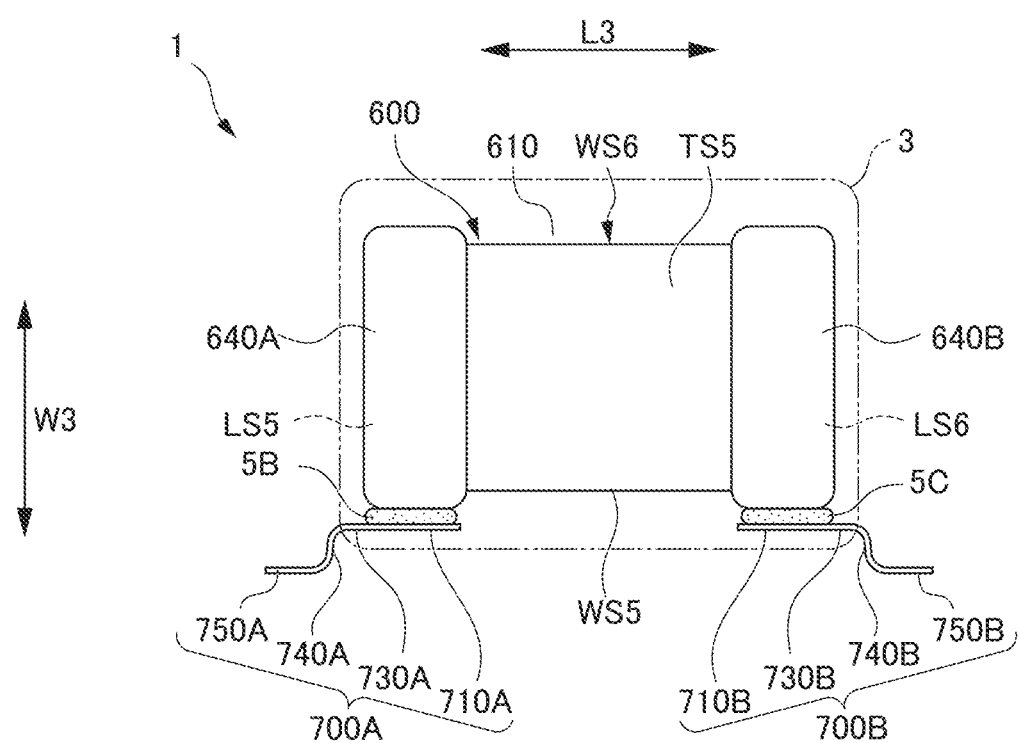
FIG. 23 is a virtual arrow view when the multilayer ceramic capacitor of FIG. 20 is viewed in the direction of the arrow XIX.

Hereinafter, a second modification of the multilayer ceramic capacitor 1 of the above example embodiment will be described with reference to FIGS. 20 to 23. In the following description, the same or corresponding components as those in any of the above-described example embodiments and modifications are denoted by the same reference numerals, and detailed description thereof is omitted. FIG. 20 is a virtual perspective view of a second modification of the multilayer ceramic capacitor 1 of the present example embodiment. FIG. 21 is a virtual arrow view of the multilayer ceramic capacitor 1 of FIG. 20 as viewed in the direction of the arrow XVII. FIG. 22 is a virtual arrow view of the multilayer ceramic capacitor 1 of FIG. 20 as viewed in the direction of the arrow XVIII. FIG. 23 is a virtual arrow view of the multilayer ceramic capacitor 1 of FIG. 20 as viewed in the direction of the arrow XIX.

In the present modification, the configuration of each multilayer ceramic capacitor main body is different from that of the above example embodiment. The multilayer ceramic capacitor 1 of the present modification includes a plurality of third multilayer ceramic capacitor main bodies 600, specifically, four third multilayer ceramic capacitor main bodies 600.

The third multilayer ceramic capacitor main bodies 600 include the same or substantially the same configuration as each of the multilayer ceramic capacitor main bodies 2 and 200. Each of the third multilayer ceramic capacitor main bodies 600 includes a capacitor multilayer body 610, a third external electrode 640A, and a third external electrode 640B. Each of the capacitor multilayer bodies 610 includes a fifth main surface TS5 and a sixth main surface TS6 opposed to each other in the lamination direction T3, a fifth lateral surface WS5 and a sixth lateral surface WS6 opposed to each other in the width direction W3 orthogonal or substantially orthogonal to the lamination direction T3, and a fifth end surface LS5 and a sixth end surface LS6 opposed to each other in the length direction L3 orthogonal or substantially orthogonal to the lamination direction T3 and the width direction W3. The third external electrodes 640A and the third external electrodes 640B respectively sandwich the capacitor multilayer bodies 610 in the length direction L3. The third external electrodes 640A are provided on the fifth end surface LS5 side. The third external electrodes 640B are provided on the sixth end surface LS6 side.

However, the third multilayer ceramic capacitor main bodies 600 are different from the multilayer ceramic capacitor main bodies 2 and 200 in that the dimension of the third multilayer ceramic capacitor main bodies 600 in the lamination direction T3 is smaller than the dimension of the multilayer ceramic capacitor main bodies 2 and 200 in the lamination directions T1 and T2.

Among the plurality of third multilayer ceramic capacitor main bodies 600, at least one third multilayer ceramic capacitor main body 600 corresponds to a first multilayer ceramic electronic component main body, and third multilayer ceramic capacitor main bodies 600 other than that corresponding to the first multilayer ceramic electronic component main body correspond to second multilayer ceramic electronic component main bodies. Further, any third multilayer ceramic capacitor main body 600 among the plurality of third multilayer ceramic capacitor main bodies 600 may arbitrarily correspond to the first multilayer ceramic electronic component main body (or the second multilayer ceramic electronic component main body).

Further, each configuration of the third multilayer ceramic capacitor main body 600 corresponding to the first multilayer ceramic electronic component corresponds to each configuration of the first multilayer ceramic electronic component. More specifically, in the third multilayer ceramic capacitor main body 600 corresponding to the first multilayer ceramic electronic component, the third external electrode 640A and the third external electrode 640B may correspond to the first external electrode in the claims, the fifth main surface TS5 and the sixth main surface TS6 may respectively correspond to the first main surface and the second main surface, the fifth lateral surface WS5 and the sixth lateral surface WS6 may respectively correspond to the first main surface and the second main surface in the claims, and the fifth end surface LS5 and the sixth end surface LS6 may respectively correspond to the first end surface and the second end surface.

Each configuration of the third multilayer ceramic capacitor main bodies 600 corresponding to the second multilayer ceramic electronic component corresponds to each configuration of the second multilayer ceramic electronic component. More specifically, in the third multilayer ceramic capacitor main body 600 corresponding to the second multilayer ceramic electronic component, the third external electrode 640A and the third external electrode 640B may correspond to the second external electrode in the claims, the fifth main surface TS5 and the sixth main surface TS6 may respectively correspond to the third main surface and the fourth main surface in the claims, the fifth lateral surface WS5 and the sixth lateral surface WS6 may respectively correspond to the third main surface and the fourth main surface in the claims, and the fifth end surface LS5 and the sixth end surface LS6 may respectively correspond to the third end surface and the fourth end surface.

Further, in the present modification, the arrangement of the third multilayer ceramic capacitor main bodies 600 differs from the above example embodiment and the above modification.

The third multilayer ceramic capacitor main bodies 600 are arranged side by side in the lamination direction T3 of the third multilayer ceramic capacitor main bodies 600. In the third multilayer ceramic capacitor main bodies 600 adjacent to each other, one fifth main surface TS5 and the other sixth main surface TS6 are opposed to each other. In the third multilayer ceramic capacitor main bodies 600 adjacent to each other, the third external electrodes 640A are opposed to each other and the third external electrodes 640B are opposed to each other. One of the first bonding material 5A or the exterior material 3 is provided between the third external electrodes 640A. One of the first bonding material 5A or the exterior material 3 is provided between the third external electrodes 640B. The third external electrodes 640A are bonded by the first bonding material 5A. The third external electrodes 640B are bonded by the first bonding material 5A.

Each of the third multilayer ceramic capacitor main bodies 600 is positioned with the fifth lateral surface WS5 side facing the mounting substrate (not shown).

In the present modification, the configurations of the first metal terminal and the second metal terminal are different from those in the above example embodiment.

The multilayer ceramic capacitor 1 of the present modification includes a first metal terminal 700A and a second metal terminal 700B.

The first metal terminal 700A includes the same or substantially the same configuration as the first metal terminal 500A in the first modification, and includes a first bonding portion 710A, a first extension portion 730A, a first falling portion 740A, and a first mounting portion 750A. However, the present modification is different from the first modification in that the first bonding portion 710A is bonded to the plurality of third external electrodes 640A. The first bonding portion 710A is bonded to the surface of each third external electrode 640A on the fifth lateral surface WS5. The first metal terminal 700A, the first falling portion 740A, and the first mounting portion 750A may have the same dimension in the lamination direction T3.

One of the second bonding material 5B or the exterior material 3 is provided between the first metal terminal 700A (the first bonding portion 710A) and each third external electrode 640A. The first bonding portion 710A and each third external electrodes 640A are bonded to each other by the second bonding material 5B.

The second metal terminal 700B includes the same or substantially the same configuration as the second metal terminal 700B in the first modification, and includes a second bonding portion 710B, a second extension portion 730B, a second falling portion 740B, and a second mounting portion 750B. However, the present modification is different from the first modification in that the second bonding portion 710B is bonded to the plurality of third external electrodes 640B. The second bonding portion 710B is bonded to the surface of each third external electrode 640B on the fifth lateral surface WS5. The second metal terminal 700B, the second falling portion 740B, and the second mounting portion 750B have the same dimension in the lamination direction T3.

One of the third bonding material 5C or the exterior material 3 is provided between the second metal terminal 700B (the second bonding portion 710B) and each of the third external electrodes 640B. The second bonding portion 710B and the third external electrodes 640B are bonded to each other by the third bonding material 5C.

Even in the present modification, it is possible to obtain the advantageous effects of the present disclosure.

The number of the multilayer ceramic capacitor main bodies included in the multilayer ceramic capacitor 1 is not particularly limited.

Figure 24:
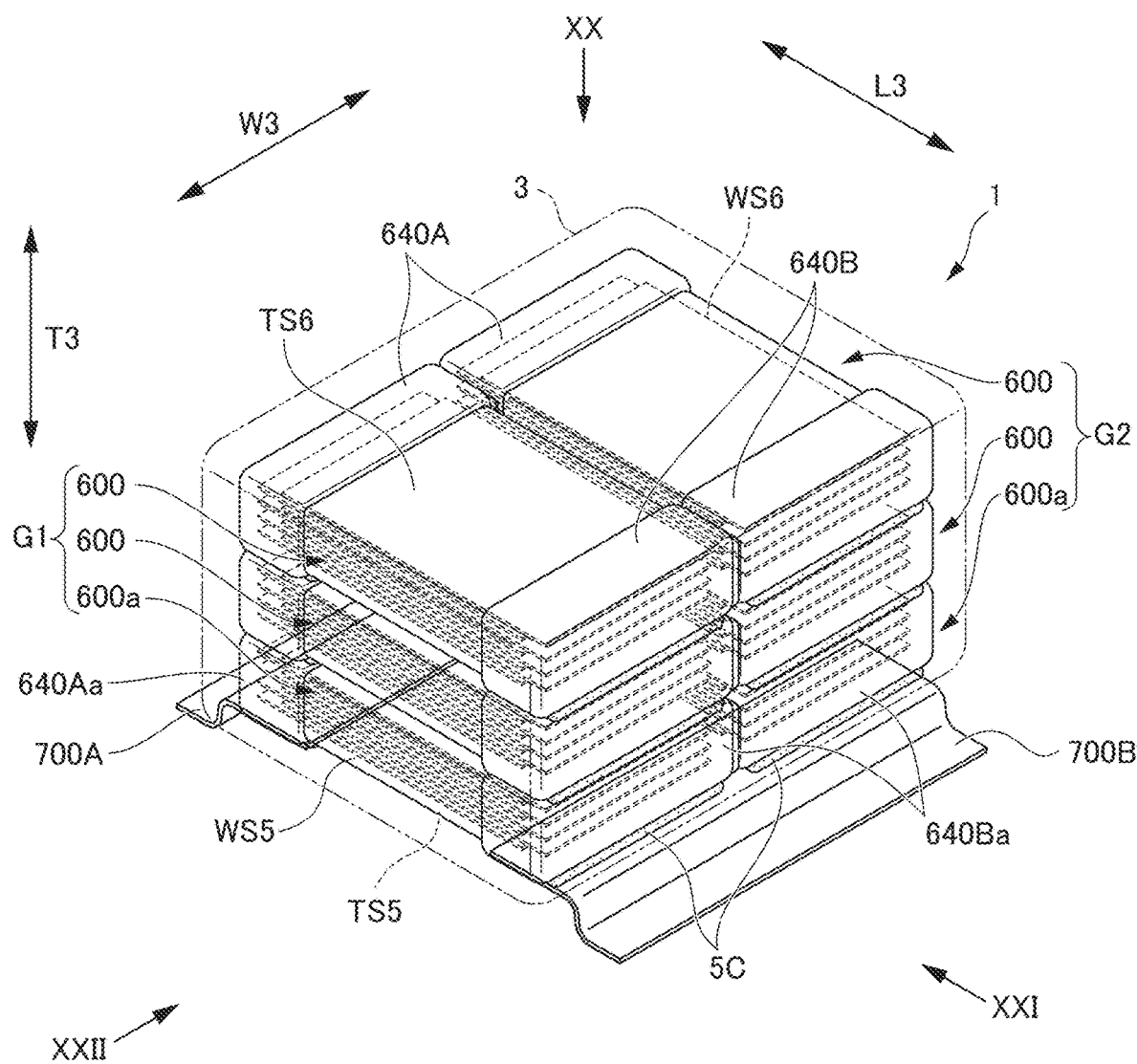
FIG. 24 is a virtual perspective view of a third modification of a multilayer ceramic capacitor according to an example embodiment of the present invention.
Figure 25:
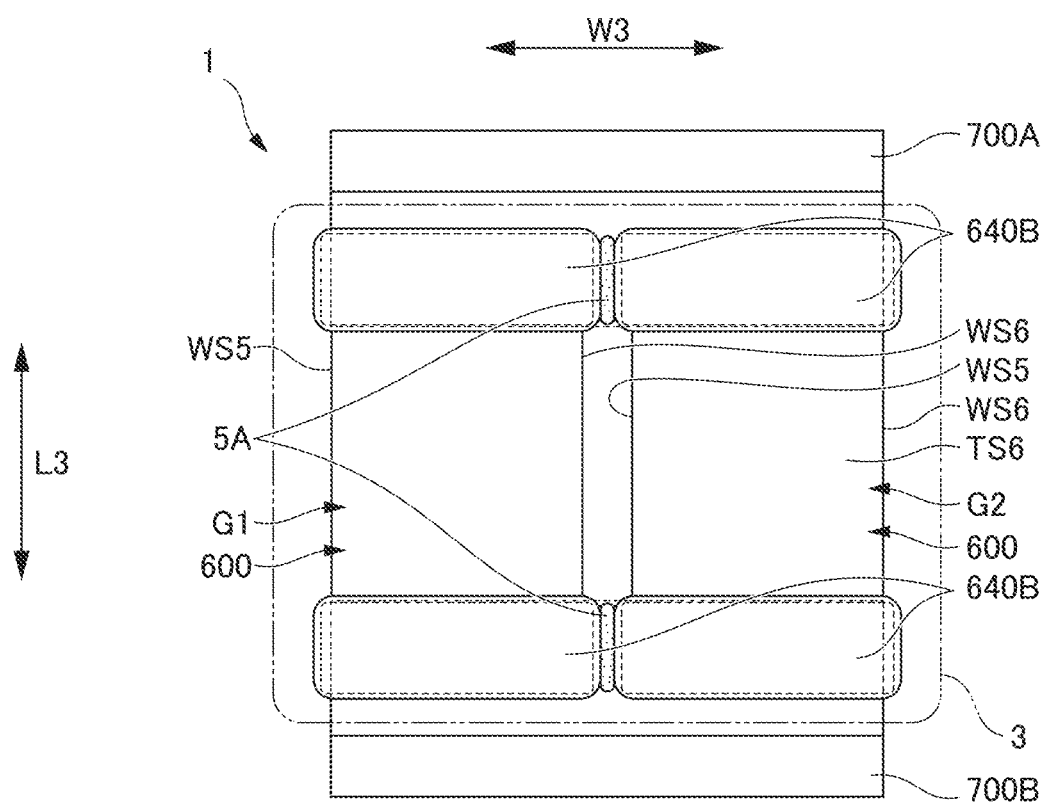
FIG. 25 is a virtual arrow view when the multilayer ceramic capacitor of FIG. 24 is viewed in the direction of the arrow XX.
Figure 26:
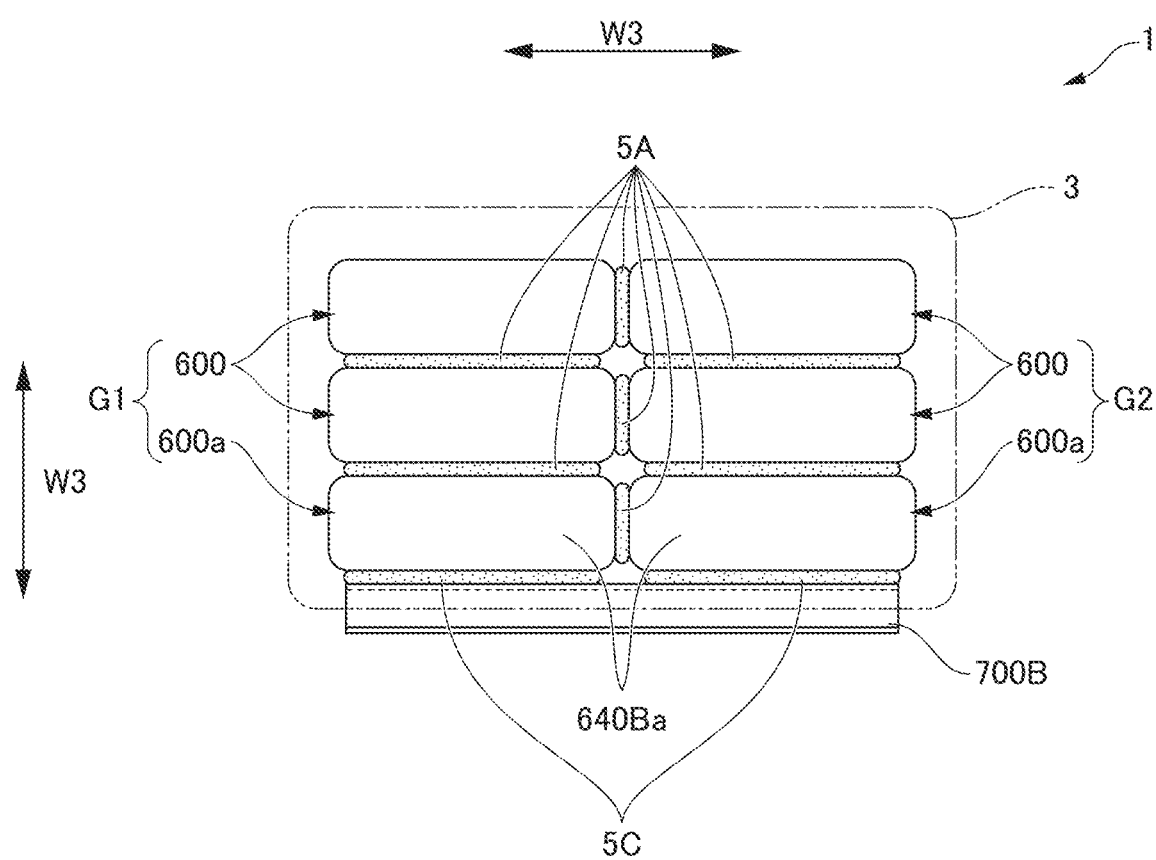
FIG. 26 is a virtual arrow view when the multilayer ceramic capacitor of FIG. 24 is viewed in the direction of the arrow XXI.
Figure 27:
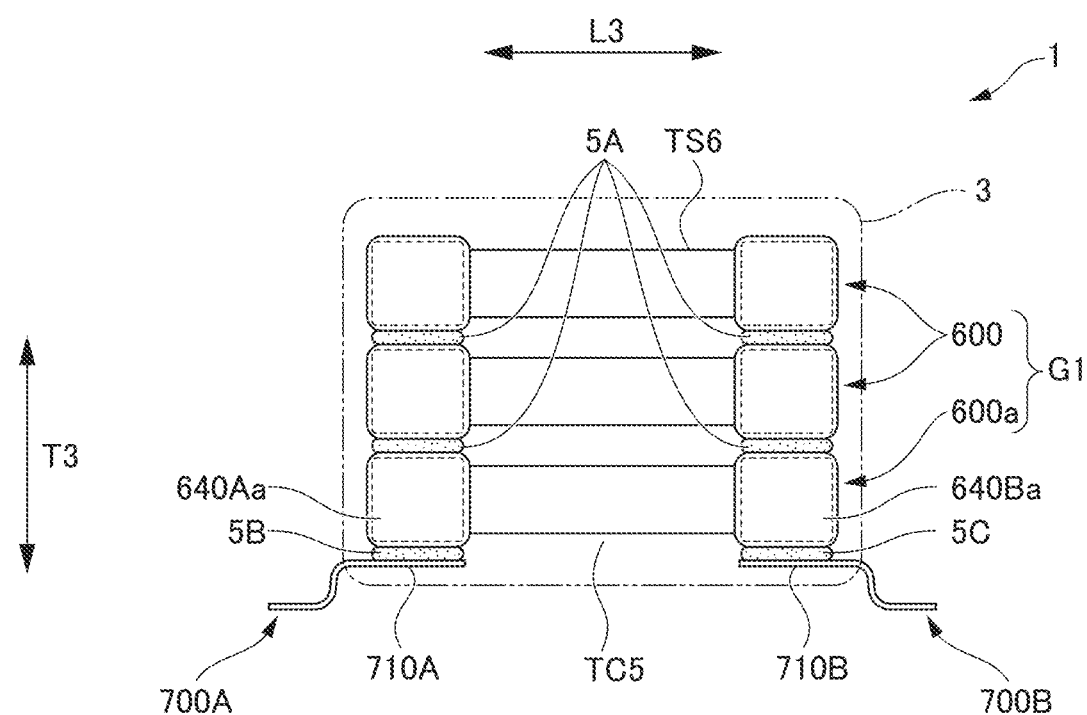
FIG. 27 is a virtual arrow view when the multilayer ceramic capacitor of FIG. 24 is viewed in the direction of the arrow XXII.

Hereinafter, a third modification of the multilayer ceramic capacitor 1 of the above example embodiment will be described with reference to FIGS. 24 to 27. In the following description, the same or corresponding components as those in any of the above-described example embodiments and the above modifications are denoted by the same reference numerals, and a detailed description thereof is omitted. FIG. 24 is a virtual perspective view of a third modification of the multilayer ceramic capacitor of the present example embodiment. FIG. 25 is a virtual perspective view of the multilayer ceramic capacitor of FIG. 24, as viewed in the direction of the arrow XX. FIG. 26 is a virtual perspective view of the multilayer ceramic capacitor of FIG. 24, as viewed in the direction of the arrow XXI. FIG. 27 is a virtual perspective view of the multilayer ceramic capacitor of FIG. 24, as viewed in the direction of the arrow XXII.

The multilayer ceramic capacitor 1 of the present modification includes third multilayer ceramic capacitor main bodies 600 which are the same or substantially the same as those of the second modification. However, the present modification differs from the second modification in the arrangement of the third multilayer ceramic capacitor main bodies 600.

In the present modification, the multilayer ceramic capacitor 1 includes a plurality of third multilayer ceramic capacitor main bodies 600, specifically, six third multilayer ceramic capacitor main bodies 600. Each of the third multilayer ceramic capacitor main bodies 600 is positioned with the fifth main surface TS5 side facing the mounting substrate (not shown).

Among the plurality of third multilayer ceramic capacitor main bodies 600, some of the third multilayer ceramic capacitor main bodies 600 are provided side by side in the lamination direction T3. In the third multilayer ceramic capacitor main bodies 600 adjacent to each other in the lamination direction T3, one third external electrode 640A and the other third external electrode 640A are opposed to each other, and one third external electrode 640B and the other third external electrode 640B are opposed to each other.

One of the first bonding material 5A or the exterior material 3 is provided between the third external electrodes 640A opposed to each other in the lamination direction T3. The third external electrodes 640A opposed to each other in the lamination direction T3 are bonded to each other by the first bonding material 5A.

One of the first bonding material 5A or the exterior material 3 is provided between the third external electrodes 640B opposed to each other in the lamination direction T3. The third external electrodes 640B opposed to each other in the lamination direction T3 are bonded to each other by the first bonding material 5A.

With such a configuration, a plurality of capacitor assemblies G provided by the plurality of third multilayer ceramic capacitor main bodies 600 arranged in the lamination direction T3 are provided.

The multilayer ceramic capacitor 1 of the present modification includes, as capacitor assemblies G, a capacitor assembly G1 and a capacitor assembly G2 each including three third multilayer ceramic capacitor main bodies 600. The capacitor assembly G1 and the capacitor assembly G2 are collectively referred to as "capacitor assemblies G" when there is no need to distinguish them from each other.

In the following description, in each capacitor assembly G, the third multilayer ceramic capacitor main body 600 provided closest to the mounting substrate is referred to as a "third multilayer ceramic capacitor main body 600a". The third external electrode 640A of the third multilayer ceramic capacitor main body 600a is referred to as a "third external electrode 640Aa". The third external electrode 640B of the third multilayer ceramic capacitor main body 600a is referred to as a "third external electrode 640Ba".

The capacitor assembly G1 and the capacitor assembly G2 are provided side by side in the width direction W3. In the third multilayer ceramic capacitor main bodies 600 adjacent to each other in the width direction W3, the surface of one third external electrode 640A on the fifth lateral surface WS5 and the surface of the other third external electrode 640A on the sixth lateral surface WS6 are opposed to each other. One of the first bonding material 5A or the exterior material 3 is provided between the third external electrodes 640A opposed to each other in the width direction W3. The third external electrodes 640A opposed to each other in the width direction W3 are bonded to each other by the first bonding material 5A.

In the third multilayer ceramic capacitor main bodies 600 adjacent to each other in the width direction W3, the surface of one third external electrode 640B on the fifth lateral surface WS5 and the surface of the other third external electrode 640B on the sixth lateral surface WS6 are opposed to each other. One of the first bonding material 5A or the exterior material 3 is provided between the third external electrodes 640B opposed to each other in the width direction W3. The third external electrodes 640A opposed to each other in the width direction W3 are bonded to each other by the first bonding material 5A.

The first metal terminal 700A is connected to the third external electrode 640Aa of the third multilayer ceramic capacitor main body 600a of the capacitor assembly G1 and the third external electrode 640Aa of the third multilayer ceramic capacitor main body 600a of the capacitor assembly G2. The first metal terminal 700A is connected to each of the surfaces of the third external electrodes 640Aa on the fifth main surfaces TS5 via the second bonding material 5B.

The second metal terminal 700B is connected to the third external electrode 640Ba of the third multilayer ceramic capacitor main body 600a of the capacitor assembly G1 and the third external electrode 640Ba of the third multilayer ceramic capacitor main body 600a of the capacitor assembly G2. The second metal terminal 700B is connected to each of the surfaces of the third external electrodes 640Ba on the fifth main surfaces TS5 via the third bonding material 5C.

As described above, in the multilayer ceramic capacitor 1, a plurality of third multilayer ceramic capacitor main bodies may be connected to provide the capacitor assembly G, and a plurality of capacitor assemblies G may be arranged.

Even in the present modification, it is possible to obtain the advantageous effects of the present disclosure.

Figure 28:
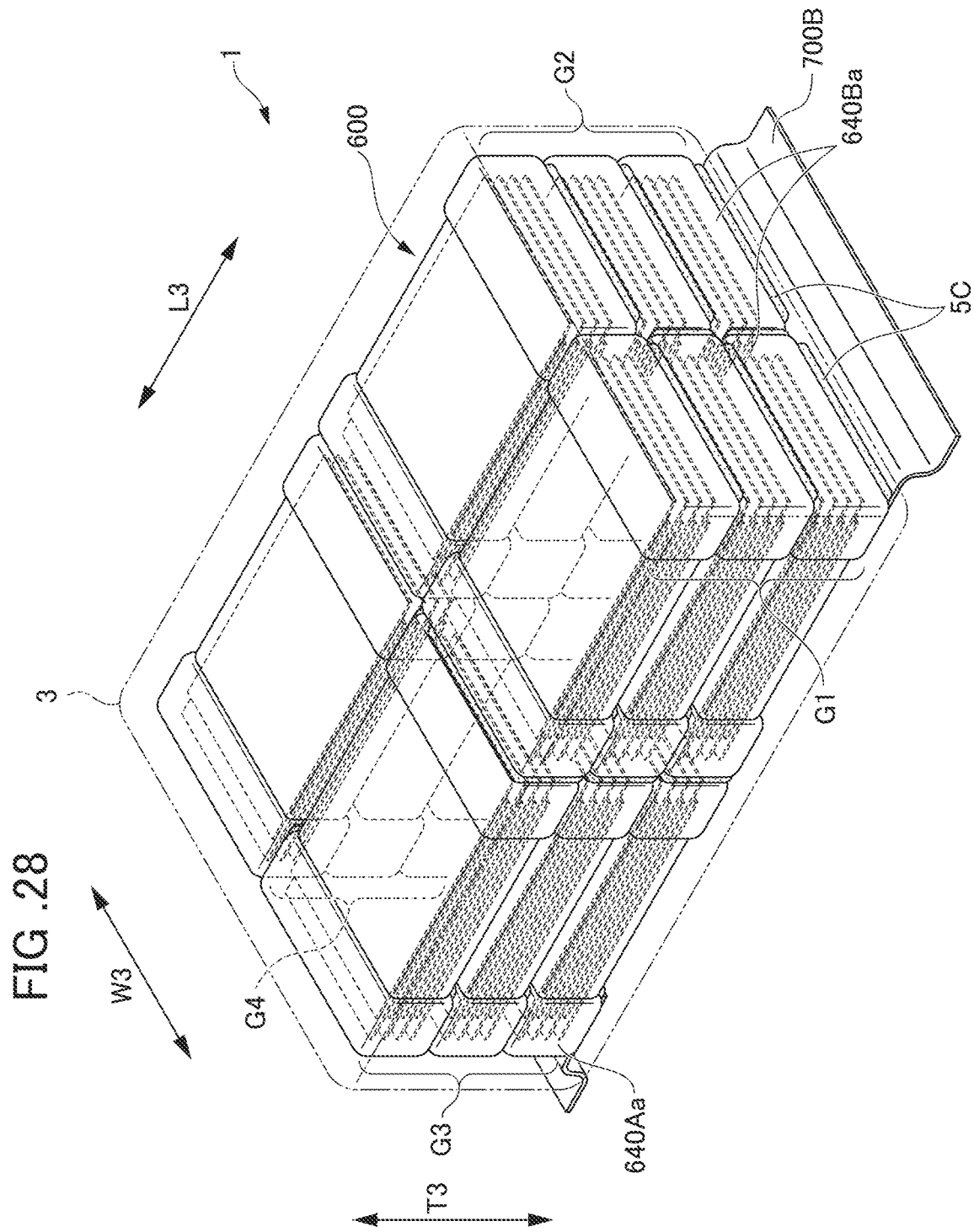
FIG. 28 is a virtual perspective view of a fourth modification of a multilayer ceramic capacitor according to an example embodiment of the present invention.
Figure 29:
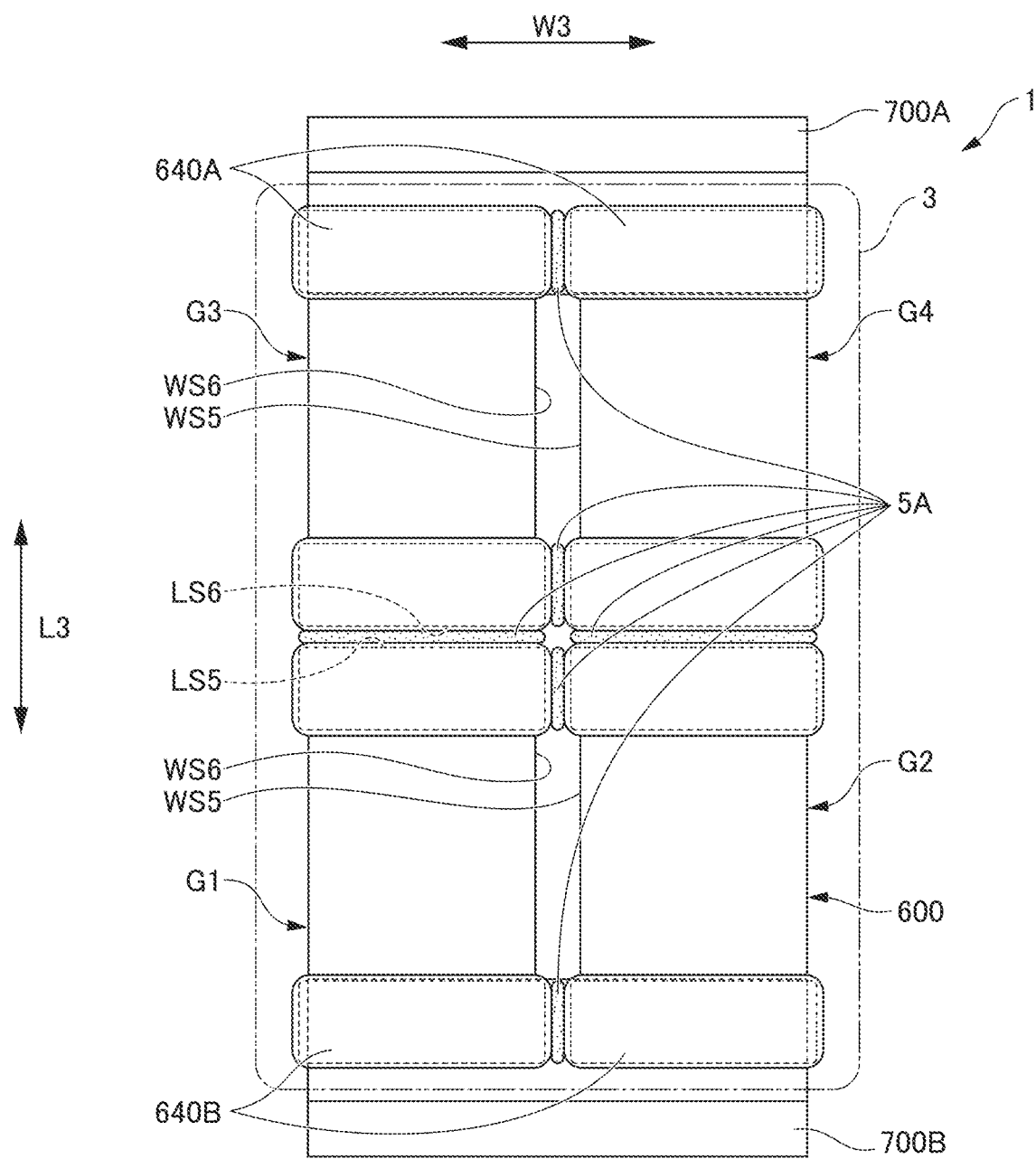
FIG. 29 is a virtual arrow view when the multilayer ceramic capacitor of FIG. 28 is viewed in the direction of the arrow XXIII.
Figure 30:
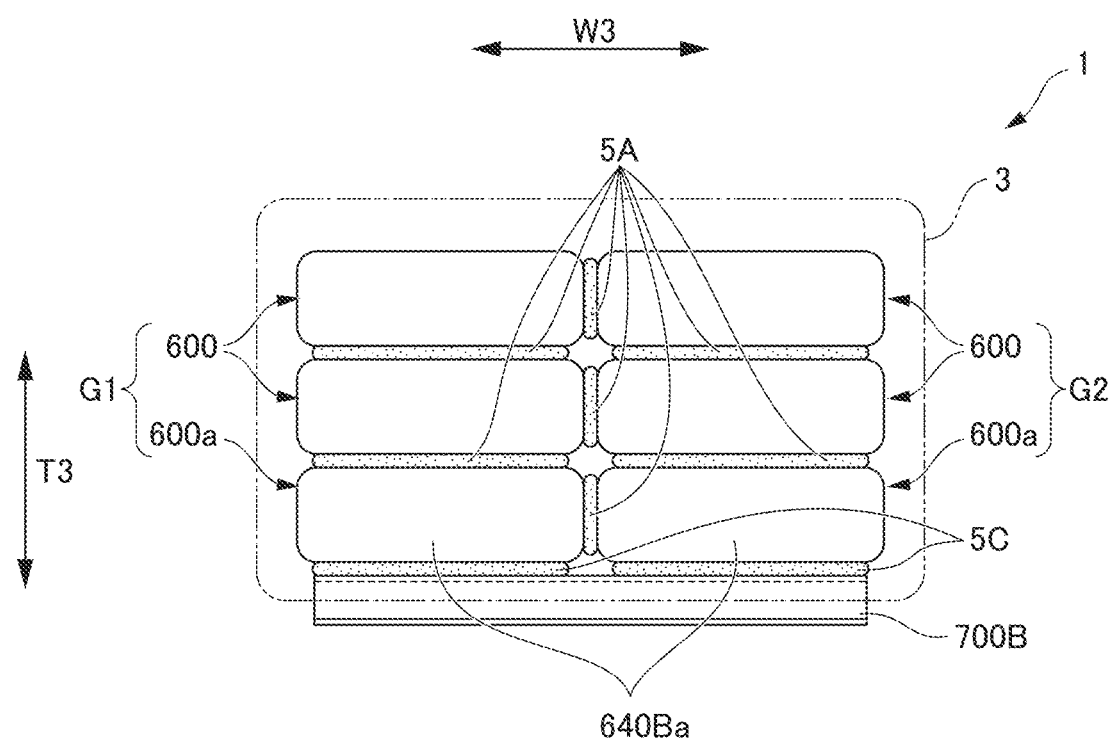
FIG. 30 is a virtual arrow view when the multilayer ceramic capacitor of FIG. 28 is viewed in the direction of the arrow XXIV.

A fourth modification of the multilayer ceramic capacitor 1 of the above example embodiment will be described below with reference to FIGS. 28 to 31. In the following description, the same or corresponding components as those in any of the above-described example embodiments and the modified examples are denoted by the same reference numerals, and a detailed description thereof is omitted. FIG. 28 is a virtual perspective view of a fourth modification of the multilayer ceramic capacitor 1 of the present example embodiment. FIG. 29 is a virtual arrow view of the multilayer ceramic capacitor 1 of FIG. 28 as viewed in the direction of the arrow XXIII. FIG. 30 is a virtual arrow view of the multilayer ceramic capacitor 1 of FIG. 28 as viewed in the direction of the arrow XXIV. FIG. 31 is a virtual arrow view of the multilayer ceramic capacitor 1 of FIG. 28 as viewed in the direction of the arrow XXV.

The multilayer ceramic capacitor 1 of the present modification includes a capacitor assembly G the same as or similar to that of the third modification. However, the present modification differs from the third modification in the number and arrangement of the capacitor assemblies G.

The multilayer ceramic capacitor 1 of the present modification includes four capacitor assemblies G. Hereinafter, the four capacitor assemblies G are referred to as a capacitor assembly G1, a capacitor assembly G2, a capacitor assembly G3, and a capacitor assembly G4, respectively.

Similarly to the third modification, the capacitor assembly G1 and the capacitor assembly G2 are provided side by side in the width direction W3, and are bonded by the first bonding materials 5A.

The capacitor assembly G3 and the capacitor assembly G1 are provided side by side in the length direction L3. The third external electrodes 640A included in the capacitor assembly G1 and the third external electrodes 640B included in the capacitor assembly G3 are opposed to each other. The third external electrodes 640A included in the capacitor assembly G1 and the third external electrodes 640B included in the capacitor assembly G3 are bonded to each other by the first bonding material 5A.

The capacitor assembly G4 is provided side by side in the length direction L3 with the capacitor assembly G2, and is provided side by side in the width direction W3 with the capacitor assembly G3.

The third external electrodes 640A included in the capacitor assembly G2 and the third external electrodes 640B included in the capacitor assembly G4 are opposed to each other. The third external electrodes 640A included in the capacitor assembly G2 and the third external electrodes 640B included in the capacitor assembly G4 are bonded to each other by the first bonding material 5A.

The third external electrodes 640A included in the capacitor assembly G3 and the third external electrodes 640A included in the capacitor assembly G4 are bonded to each other by the first bonding material 5A. The third external electrodes 640B included in the capacitor assembly G3 and the third external electrodes 640B included in the capacitor assembly G4 are bonded to each other by the first bonding material 5A.

The multilayer ceramic capacitor 1 of the present modification includes a first metal terminal 700A and a second metal terminal 700B the same as or similar to those of the third modification.

The first metal terminal 700A is bonded to the third external electrode 640Aa included in the capacitor assembly G3 and the third external electrode Aa included in the capacitor assembly G4 by the second bonding material 5B.

The second metal terminal 700B is bonded to the second external electrode Ba included in the capacitor assembly G1 and the third external electrode Ba included in the capacitor assembly G2 by the third bonding material 5C.

Thus, the number of capacitor assemblies G included in the multilayer ceramic capacitor 1 is not particularly limited.

Even in the present modification, it is possible to obtain the advantageous effects of the present disclosure.

According to the multilayer ceramic capacitor 1 of the present example embodiment, the following advantageous effects can be obtained.

In the multilayer ceramic capacitor 1, the porosity of the exterior material 3 is relatively lower than the porosity of the first bonding material 5A. With such a configuration, the first bonding material 5A can sufficiently bite into the irregularities of the surface of the exterior material 3, and the adhesion between the surface of the first bonding material 5A and the exterior material 3 can be improved. Therefore, it is possible to reduce or prevent the occurrence of peeling between the first bonding material 5A and the exterior material 3 while reducing the permeation of steam from the outside. Further, it is possible to absorb the stress applied to the capacitor multilayer bodies 10 and 210 from the outside.

In the multilayer ceramic capacitor 1 of the present example embodiment, the porosity of the exterior material 3 is preferably relatively lower than the porosity of the second bonding material 5B and the third bonding material 5C. In such a case, the second bonding material 5B and the third bonding material 5C sufficiently bite into the irregularities of the surface of the exterior material 3, and the adhesion between the surfaces of the second bonding material 5B and the third bonding material 5C and the exterior material 3 can be improved. Therefore, it is possible to reduce or prevent the occurrence of peeling between the second bonding material 5B and the third bonding material 5C and the exterior material while reducing the permeation of steam from the outside. Further, it is possible to absorb the stress applied to the capacitor multilayer bodies 10 and 210 from the outside.

According to the multilayer ceramic capacitor 1 of the above example embodiment, the porosity of the first bonding material 5A is preferably higher than the porosity of the second bonding material 5B and the porosity of the third bonding material 5C. In such a case, the first external electrode 40A and the first external electrode 40B of the first multilayer ceramic capacitor main body 2 are sufficiently bonded to the first metal terminal 100A and the second metal terminal 100B, and the occurrence of peeling between the first bonding material 5A and the exterior material 3 can be suppressed.

According to the multilayer ceramic capacitor 1 of the above example embodiment, the porosity of the first bonding material 5A is preferably, for example, about 20% or more and about 50% or less. With such a configuration, it is possible to reduce or prevent the occurrence of peeling between the exterior material 3 and the first bonding material 5A more appropriately, while reducing the permeation of steam from the outside. Further, it is possible to absorb the stress applied to the capacitor multilayer bodies 10 and 210 from the outside.

According to the multilayer ceramic capacitor 1 of the above example embodiment, the porosity of the second bonding material 5B and the porosity of the third bonding material 5C are preferably, for example, about 20% or more and about 50% or less. In such a case, it is possible to reduce or prevent the occurrence of peeling between the exterior material 3 and the second bonding material 5B and the third bonding material 5C more appropriately, while reducing the permeation of steam from the outside. Further, it is possible to absorb the stress applied to the capacitor multilayer bodies 10 and 210 from the outside.

According to the multilayer ceramic capacitor 1 of the above example embodiment, the porosity of the exterior material is preferably about 10% or less. In such a case, it is possible to reduce permeation of steam from the outside more suitably.

The present invention is not limited to the configuration of the above example embodiments, and can be appropriately modified and applied without departing from the gist of the present invention. The present invention also includes combinations of two or more of the individual desirable configurations described in the above example embodiments.

Although example embodiments and modifications thereof of the present invention have been described above, the present invention is not limited thereto, and includes the following scope.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a first multilayer ceramic electronic component main body including a first multilayer body and a plurality of first external electrodes, the first multilayer body including a plurality of first ceramic layers laminated therein, a plurality of first internal conductor layers laminated respectively on the plurality of first ceramic layers therein, a first main surface and a second main surface opposed to each other in a first lamination direction in which the plurality of first ceramic layers and the plurality of first internal conductor layers are laminated, a first lateral surface and a second lateral surface opposed to each other in a first width direction orthogonal or substantially orthogonal to the first lamination direction, and a first end surface and a second end surface opposed to each other in a first length direction orthogonal or substantially orthogonal to the first lamination direction and the first width direction;
a second multilayer ceramic electronic component main body including a second multilayer body and a plurality of second external electrodes, the second multilayer body including a plurality of second ceramic layers laminated therein, a plurality of second internal conductor layers laminated respectively on the plurality of second ceramic layers therein, a third main surface and a fourth main surface opposed to each other in a second lamination direction in which the plurality of second ceramic layers and the plurality of second internal conductor layers are laminated, a third lateral surface and a fourth lateral surface opposed to each other in a second width direction orthogonal or substantially orthogonal to the second lamination direction, and a third end surface and a fourth end surface opposed to each other in a second length direction orthogonal or substantially orthogonal to the second lamination direction and the second width direction;

a first bonding material bonding any one of the plurality of first external electrodes and any one of the plurality of second external electrodes;

a first metal terminal connectable to at least one external electrode selected from the plurality of first external electrodes and the plurality of second external electrodes;

a second metal terminal connectable to at least one external electrode which is different from the external electrode to which the first metal terminal is connected and selected from the plurality of first external electrodes and the plurality of second external electrodes; and an exterior material covering the first multilayer ceramic electronic component main body, the second multilayer ceramic electronic component main body, a portion of the first metal terminal, and a portion of the second metal terminal; wherein the first bonding material is bonded to the exterior material; and a porosity of the first bonding material is higher than a porosity of the exterior material.

2. The multilayer ceramic electronic component according to claim 1, further comprising:

a second bonding material bonding at least one external electrode selected from the plurality of first external electrodes and the plurality of second external electrodes, and the first metal terminal; and a third bonding material bonding at least one external electrode which is different from the external electrode to which the first metal terminal is connected and selected from the plurality of first external electrodes and the plurality of second external electrodes, and the second metal terminal; wherein the second bonding material and the third bonding material are bonded to the exterior material; and a porosity of the second bonding material and a porosity of the third bonding material are higher than the porosity of the exterior material.

3. The multilayer ceramic electronic component according to claim 1, further comprising:

a second bonding material bonding at least one external electrode selected from the plurality of first external electrodes and the plurality of second external electrodes, and the first metal terminal; and a third bonding material bonding at least one external electrode which is different from the external electrode to which the first metal terminal is connected and selected from the plurality of first external electrodes and the plurality of second external electrodes, and the second metal terminal; wherein the porosity of the first bonding material is higher than the porosity of the second bonding material and the porosity of the third bonding material.

4. The multilayer ceramic electronic component according to claim 1, wherein the porosity of the first bonding material is about 20% or more and about 50% or less.

5. The multilayer ceramic electronic component according to claim 2, wherein the porosity of the second bonding material and the porosity of the third bonding material are about 20% or more and about 50% or less.

6. The multilayer ceramic electronic component according to claim 1, wherein the porosity of the exterior material is about 10% or less.

7. The multilayer ceramic electronic component according to claim 1, wherein a dimension of the first multilayer body in the first length direction is about 0.2 mm or more and about 10 mm or less, a dimension of the first multilayer body in the first lamination direction is about 0.1 mm or more and about 10 mm or less, and a dimension of the first multilayer body in the first width direction is about 0.1 mm or more and about 10 mm or less.

8. The multilayer ceramic electronic component according to claim 1, wherein a dimension of the second multilayer body in the second length direction is about 0.2 mm or more and about 10 mm or less, a dimension of the second multilayer body in the first lamination direction is about 0.1 mm or more and about 10 mm or less, and a dimension of the second multilayer body in the first width direction is about 0.1 mm or more and about 10 mm or less.

9. The multilayer ceramic electronic component according to claim 1, wherein each of the plurality of first ceramic layers includes $BaTiO_3$, $CaTiO_3$, $SrTiO_3$, or $CaZrO_3$ as a main component.

10. The multilayer ceramic electronic component according to claim 1, wherein each of the plurality of first ceramic layers includes a Mn compound, an Fe compound, a Cr compound, a Co compound, or a Ni compound as a sub-component.

11. The multilayer ceramic electronic component according to claim 1, wherein each of the plurality of first ceramic layers has a thickness of about 0.5 μm or more and about 72 μm or less.

12. The multilayer ceramic electronic component according to claim 1, wherein a number of each of the plurality of first ceramic layers is 10 or more or 700 or less.

13. The multilayer ceramic electronic component according to claim 1, wherein each of the plurality of second ceramic layers includes $BaTiO_3$, $CaTiO_3$, $SrTiO_3$, or $CaZrO_3$.

14. The multilayer ceramic electronic component according to claim 1, wherein each of the plurality of second ceramic layers includes a Mn compound, an Fe compound, a Cr compound, a Co compound, or a Ni compound as a sub-component.

15. The multilayer ceramic electronic component according to claim 1, wherein each of the plurality of second ceramic layers has a thickness of about 0.5 μm or more and about 72 μm or less.

16. The multilayer ceramic electronic component according to claim 1, wherein a number of the plurality of second ceramic layers is 10 or more or 700 or less.

* * * * *